United States Patent
Kobayashi

(10) Patent No.: US 10,715,737 B2
(45) Date of Patent: Jul. 14, 2020

(54) IMAGING DEVICE, STILL IMAGE CAPTURING METHOD, AND STILL IMAGE CAPTURING PROGRAM

(71) Applicant: FUJIFILM Corporation, Tokyo (JP)

(72) Inventor: Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/374,266

(22) Filed: Apr. 3, 2019

(65) Prior Publication Data

US 2019/0230268 A1 Jul. 25, 2019

Related U.S. Application Data

(63) Continuation of application No. PCT/JP2017/032539, filed on Sep. 8, 2017.

(30) Foreign Application Priority Data

Oct. 4, 2016 (JP) .................................. 2016-196539

(51) Int. Cl.
*H04N 5/235* (2006.01)
*H04N 5/374* (2011.01)
(Continued)

(52) U.S. Cl.
CPC .......... *H04N 5/2352* (2013.01); *G03B 7/093* (2013.01); *H04N 5/232* (2013.01); *H04N 5/243* (2013.01);
(Continued)

(58) Field of Classification Search
CPC ........ H04N 5/232; H04N 5/243; H04N 5/335; G03B 7/093
See application file for complete search history.

(56) References Cited

U.S. PATENT DOCUMENTS

2006/0264733 A1* 11/2006 Masaki .................. H04N 5/232
600/407
2008/0316330 A1 12/2008 Egawa
(Continued)

FOREIGN PATENT DOCUMENTS

| JP | 2002-135626 A | 5/2002 |
|---|---|---|
| JP | 2005-117494 A | 4/2005 |
| JP | 2009-5173 A | 1/2009 |
| JP | 2012-80457 A | 4/2012 |
| JP | 2015-138994 A | 7/2015 |

OTHER PUBLICATIONS

International Preliminary Report on Patentability and Written Opinion of the International Searching Authority (Forms PCT/IPEA/409 and PCT/ISA/237) for International Application No. PCT/JP2017/032539, dated Jan. 31, 2018, with English translation of the International Preliminary Report on Patentability.
International Search Report (Form PCT/ISA/210) for International Application No. PCT/JP2017/032539, dated Oct. 31, 2017, with English translation.

*Primary Examiner* — Antoinette T Spinks
(74) *Attorney, Agent, or Firm* — Birch, Stewart, Kolsach & Birch, LLP

(57) ABSTRACT

An imaging device includes a MOS type imaging element comprising a plurality of pixels; a mechanical shutter disposed in front of the imaging element; a driving unit that drives the imaging element; an imaging control unit that performs still image exposure control, first readout control and second readout control as defined herein; a display control unit that generates live view image data as defined herein; a first storage unit as defined herein; and an image processing unit as defined herein.

14 Claims, 11 Drawing Sheets

(51) Int. Cl.

| | |
|---|---|
| *H04N 5/243* | (2006.01) |
| *H04N 5/3745* | (2011.01) |
| *G03B 7/093* | (2006.01) |
| *H04N 5/343* | (2011.01) |
| *H04N 5/232* | (2006.01) |
| *H04N 5/335* | (2011.01) |
| *H04N 5/353* | (2011.01) |
| *H04N 5/345* | (2011.01) |
| *H04N 5/361* | (2011.01) |

(52) U.S. Cl.
CPC ............ *H04N 5/335* (2013.01); *H04N 5/343* (2013.01); *H04N 5/3452* (2013.01); *H04N 5/3456* (2013.01); *H04N 5/353* (2013.01); *H04N 5/361* (2013.01); *H04N 5/3742* (2013.01); *H04N 5/37452* (2013.01); *H04N 5/2353* (2013.01)

(56) References Cited

U.S. PATENT DOCUMENTS

| | | | |
|---|---|---|---|
| 2012/0105597 A1* | 5/2012 | Tajiri | G03B 35/02 348/49 |
| 2012/0140885 A1* | 6/2012 | Iwakiri | A61B 6/06 378/62 |
| 2017/0111563 A1 | 4/2017 | Gohara et al. | |
| 2017/0358070 A1* | 12/2017 | Sagisaka | G06T 7/337 |
| 2018/0213140 A1 | 7/2018 | Gohara et al. | |

\* cited by examiner

IMAGING DEVICE, STILL IMAGE CAPTURING METHOD, AND STILL IMAGE CAPTURING PROGRAM

CROSS REFERENCE TO RELATED APPLICATION

This is a continuation of International Application No. PCT/JP2017/032539 filed on Sep. 8, 2017, and claims priority from Japanese Patent Application No. 2016-196539 filed on Oct. 4, 2016, the entire disclosures of which are incorporated herein by reference.

BACKGROUND OF THE INVENTION

1. Field of the Invention

The present invention relates to an imaging device, a still image capturing method, and a computer readable medium storing a still image capturing program.

2. Description of the Related Art

In recent years, with high resolution of an imaging element such as a charge coupled device (CCD) image sensor or a complementary metal oxide semiconductor (CMOS) image sensor, a demand for information devices having an imaging function such as an electronic endoscope, a digital still camera, a digital video camera, or a mobile phone with a camera has been rapidly increasing. It should be noted that the information device having the imaging function as described above is referred to as an imaging device.

In the imaging device, for example, a live view image cannot be displayed on a display unit of the imaging device at the time of capturing a still image according to long-time exposure.

JP2012-080457A describes an imaging device for alternately performing signal readout from pixels in odd rows and pixels in even rows during an exposure period of an imaging element, integrating signals read out from the pixels in the odd rows in a memory, integrating signals read out from the pixels in the even rows in the memory, and combining an integrated signal of the pixels in the odd rows with an integrated signal of the pixels in the even rows to obtain a captured image signal for still image data generation.

In this imaging device, a live view display is performed on the basis of signals of the odd rows or the even rows sequentially integrated in the memory such that a live view image can continue to be displayed during still image capturing.

JP2015-138994A describes an imaging device in which an imaging element having a first area and a monitoring area is mounted. This imaging device performs a display of a live view image on the basis of signals sequentially read out from the monitoring area at the time of capturing a still image, thereby enabling the live view image to continue to be displayed during the still image capturing.

Further, this imaging device generates a pixel signal corresponding to the monitoring area using a signal read out from the first area through interpolation, thereby generating still image data free from pixel missing.

SUMMARY OF THE INVENTION

The imaging device described in JP2012-080457A generates a live view image on the basis of signals sequentially read out from pixels in odd rows or pixels in even rows and integrated. Therefore, brightness of the live view image does not become constant and display quality deteriorates.

In order to secure this display quality, it is necessary to correct brightness of each live view image, and a process becomes complicated. In addition, in a case in which a moving object is included in a subject being imaged, an afterimage appears in the live view image, and display quality deteriorates.

In the imaging device described in JP2015-138994A, a pixel signal corresponding to a monitoring area is generated by interpolation. Therefore, high quality still image data cannot be generated.

The present invention has been made in view of the above circumstances, and an object of the present invention is to provide an imaging device capable of recording high-quality still image data while enabling a live view image to continue to be displayed during still image capturing, a still image capturing method, and a still image capturing program.

An imaging device of the present invention comprises a MOS type imaging element including a plurality of pixels; a mechanical shutter disposed in front of the imaging element; a driving unit that drives the imaging element; an imaging control unit that performs still image exposure control for controlling the driving unit in a state in which the mechanical shutter is open to simultaneously start exposure of the plurality of pixels and closing the mechanical shutter to simultaneously end the exposure of the plurality of pixels, first readout control for controlling the driving unit during the exposure to read out a first captured image signal from first pixels of some of the plurality of pixels at each of a plurality of timings during the exposure, and second readout control for reading out, after the exposure ends, a second captured image signal from at least second pixels other than the first pixels among the plurality of pixels from among the first pixels and the second pixels; a display control unit that generates live view image data on the basis of the first captured image signal sequentially read out from the first pixels through the first readout control and causes an image based on the live view image data to be displayed on a display unit; a first storage unit that integrates and stores the first captured image signal sequentially read out from the first pixels through at least the first readout control between the first readout control and the second readout control, and stores the second captured image signal read out from the second pixels through the second readout control; and an image processing unit that processes a third captured image signal composed of the first captured image signal and the second captured image signal stored in the first storage unit to generate captured image data and stores the captured image data in a storage medium.

A still image capturing method of the present invention is a still image capturing method of an imaging device including a MOS type imaging element including a plurality of pixels, a mechanical shutter disposed in front of the imaging element, and a driving unit that performs driving for reading out an imaging signal from the pixel, the still image capturing method comprising: a still image exposure control step of controlling the driving unit in a state in which the mechanical shutter is open to simultaneously start exposure of the plurality of pixels and closing the mechanical shutter to simultaneously end the exposure of the plurality of pixels; a first readout control step of controlling the driving unit during the exposure to read out a first captured image signal from first pixels of some of the plurality of pixels at each of a plurality of timings during the exposure; a second readout control step of controlling the driving unit after the exposure ends to read out a second captured image signal from at least second pixels other than the first pixels among the plurality of pixels from among the first pixels and the second pixels; a display control step of generating live view image data on the basis of the first captured image signal sequentially read out from the first pixels in the first readout control step and causing an image based on the live view image data to be displayed on a display unit; a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and an image processing step of processing a third captured image signal composed of the first captured image signal and the second captured image signal stored in the first storage unit to generate captured image data and storing the captured image data in a storage medium.

A still image capturing program according to the present invention causes an imaging device including a MOS type imaging element including a plurality of pixels, a mechanical shutter disposed in front of the imaging element, and a driving unit that performs driving for reading out an imaging signal from the pixel to execute: a still image exposure control step of controlling the driving unit in a state in which the mechanical shutter is open to simultaneously start exposure of the plurality of pixels and closing the mechanical shutter to simultaneously end the exposure of the plurality of pixels; a first readout control step of controlling the driving unit during the exposure to read out a first captured image signal from first pixels of some of the plurality of pixels at each of a plurality of timings during the exposure; a second readout control step of controlling the driving unit after the exposure ends to read out a second captured image signal from at least second pixels other than the first pixels among the plurality of pixels from among the first pixels and the second pixels; a display control step of generating live view image data on the basis of the first captured image signal sequentially read out from the first pixels in the first readout control step and causing an image based on the live view image data to be displayed on a display unit; a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and an image processing step of processing a third captured image signal composed of the first captured image signal and the second captured image signal stored in the first storage unit to generate captured image data and storing the captured image data in a storage medium.

According to the present invention, it is possible to provide an imaging device capable of recording high-quality still image data while enabling a live view image to continue to be displayed during still image capturing, a still image capturing method, and a still image capturing program.

DESCRIPTION OF THE PREFERRED EMBODIMENTS

Hereinafter, embodiments of the present invention will be described with reference to the drawings.

Figure 1:
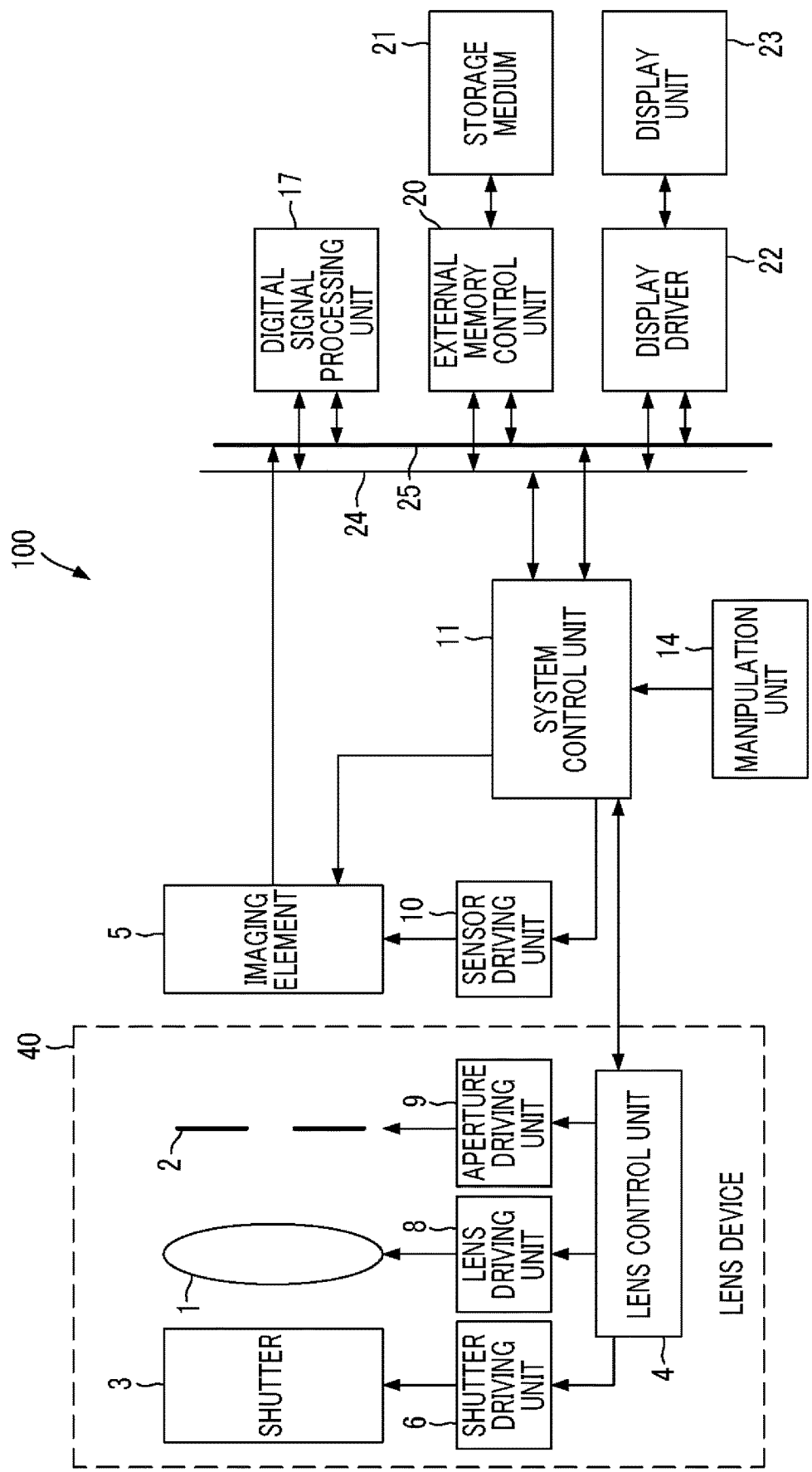
FIG. 1 is a diagram illustrating a schematic configuration of a digital camera 100 as an example of an imaging device for illustrating an embodiment of the present invention.

FIG. 1 is a diagram illustrating a schematic configuration of a digital camera 100 as an example of an imaging device illustrating an embodiment of the present invention.

The digital camera 100 comprises a lens device 40 having an imaging lens 1, an aperture 2, a mechanical shutter 3, a lens control unit 4, a shutter driving unit 6, a lens driving unit 8, and an aperture driving unit 9.

In the embodiment, the lens device 40 is described as being attachable to and detachable from a main body of the digital camera 100, but may be fixed to the main body of the digital camera 100.

The imaging lens 1 and the aperture 2 constitute an imaging optical system, and the imaging optical system includes, for example, a focus lens or the like.

The mechanical shutter 3 is a shutter mechanism that mechanically switches between a state in which light enters the imaging optical system and a state in which no light enters the imaging optical system. In the example of FIG. 1, the mechanical shutter 3 is closer to the subject side relative to the imaging optical system.

The mechanical shutter 3 may be disposed in front of the imaging element 5 (on the subject side). For example, the mechanical shutter 3 may be disposed between the imaging element 5 and the imaging optical system.

The lens control unit 4 of the lens device 40 is configured to be capable of communicating with the system control unit 11 in the main body of the digital camera 100 by cable or wirelessly.

According to a command from the system control unit 11, the lens control unit 4 opens or closes the mechanical shutter 3 via the shutter driving unit 6, drives a focus lens included in the imaging lens 1 via the lens driving unit 8, or drives the aperture 2 via the aperture driving unit 9.

The main body of the digital camera 100 comprises a MOS type imaging element 5 such as a CMOS image sensor that images a subject through the imaging optical system, a sensor driving unit 10 functioning as a driving unit for driving the imaging element 5, a system control unit 11 that performs overall control of an entire electric control system of the digital camera 100, and a manipulation unit 14.

The system control unit 11 includes various processors, a random access memory (RAM), and a read only memory (ROM), and totally controls the entire digital camera 100. In this ROM, a program including a still image capturing program is stored.

Further, the electric control system of the digital camera 100 comprises a digital signal processing unit 17 that performs interpolation calculation, gamma correction calculation, a RGB/YC conversion process, and the like on an imaging signal group output from the imaging element 5 to a data bus 25 to generate captured image data for recording and live view image data, an external memory control unit 20 to which a detachable storage medium 21 is connected, and a display driver 22 that drives a display unit 23 mounted on the back side of the digital camera 100.

The digital signal processing unit 17 includes various processors, a RAM, and a ROM, and performs various processes by the processes executing the program stored in the ROM. This program includes a still image capturing program.

The various processors include a programmable logic device (PLD) that is a processor of which a circuit configuration can be changed after manufacture, such as a central processing unit (CPU) or a field programmable gate array (FPGA) that is a general-purpose processor that executes a program to perform various processes, or a dedicated electric circuit that is a processor having a circuit configuration designed to be dedicated to execute a specific process, such as application specific integrated circuit (ASIC).

More specifically, structures of the various processors are electric circuits in which circuit elements such as semiconductor elements are combined.

Each of the processors of the system control unit 11 and the digital signal processing unit 17 may be constituted by one of various processors, or may be constituted by a combination of two or more of the same or different types of processors (for example, a combination of a plurality of FPGAs or a combination of a CPU and an FPGA).

The digital signal processing unit 17, the external memory control unit 20, and the display driver 22 are connected to each other via a control bus 24 and a data bus 25, and operate on the basis of a command from the system control unit 11.

Figure 2:
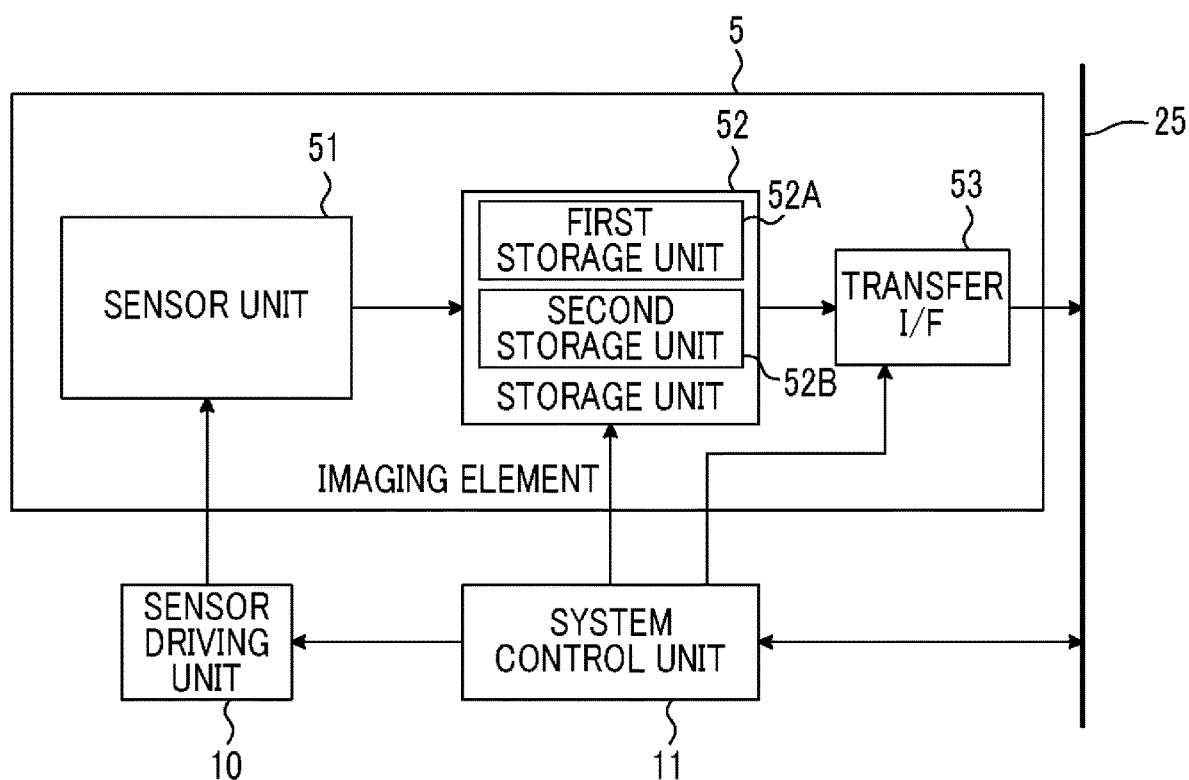
FIG. 2 is a schematic diagram illustrating a schematic configuration of an imaging element 5 mounted on the digital camera 100 illustrated in FIG. 1.

FIG. 2 is a schematic diagram illustrating a schematic configuration of the imaging element 5 mounted on the digital camera 100 illustrated in FIG. 1.

The imaging element 5 comprises a sensor unit 51, a storage unit 52, and a transfer interface (I/F) 53.

The sensor unit 51 images a subject and outputs a captured image signal. The sensor unit 51 is driven by the sensor driving unit 10.

The storage unit 52 stores an imaging signal output from the sensor unit 51, and includes a first storage unit 52A and a second storage unit 52B.

Each of the first storage unit 52A and the second storage unit 52B includes a large number of storage elements such as a capacitor or a flip-flop for storing data, and a control circuit (not illustrated) that controls storage and readout of data in and from the plurality of storage elements. These control circuits are controlled by the system control unit 11.

Each of the first storage unit 52A and the second storage unit 52B may be any unit as long as the unit includes a rewritable storage element. A semiconductor memory, a ferroelectric memory, or the like can be used.

For each of the first storage unit 52A and the second storage unit 52B, for example, a static random access memory (SRAM), a dynamic random access memory (DRAM), a ferroelectric random access memory (FRAM (registered trademark)), a flash memory, or the like can be used.

The first storage unit 52A can store a number of imaging signals that is the same as the total number of pixels included in the sensor unit 51.

The second storage unit 52B is capable of storing a number of imaging signals that is smaller than the total number of pixels included in the sensor unit 51.

The transfer interface 53 is an interface for transferring the imaging signal from the imaging element 5 to the data bus 25, and is controlled by the system control unit 11.

The transfer interface 53 includes, for example, an interface conforming to a standard such as scalable low voltage signaling (SLVS).

The imaging signals stored in the first storage unit 52A and the second storage unit 52B are output to the data bus 25 by the transfer interface 53. The transfer interface 53 functions as a transfer unit.

Examples of a configuration of the imaging element 5 include the following four configurations, but the present invention is not limited thereto.

[1] A configuration in which the sensor unit 51 and the storage unit 52 are formed on one chip.

[2] A configuration in which a chip on which the sensor unit 51 has been formed and a chip on which the storage unit 52 has been formed are stacked and the two chips are electrically connected by stud bumps.

[3] A configuration in which the sensor unit 51 and the storage unit 52 are accommodated in one package, and pads of the sensor unit 51 and pads of the storage unit 52 are connected by wire bonding.

[4] A configuration in which the sensor unit 51 and the storage unit 52 are accommodated in separate packages and the two packages are connected by a lead frame.

From the viewpoints of reduction in power consumption, high speed, and miniaturization of the imaging element 5, the configuration [1] is most preferable, the configuration [2] is preferable after [1], the configuration [3] is preferable after [2], and the configuration [4] is preferable after [3]. According to the configurations [3] and [4], the imaging element 5 can be manufactured without using an advanced technique.

Figure 3:
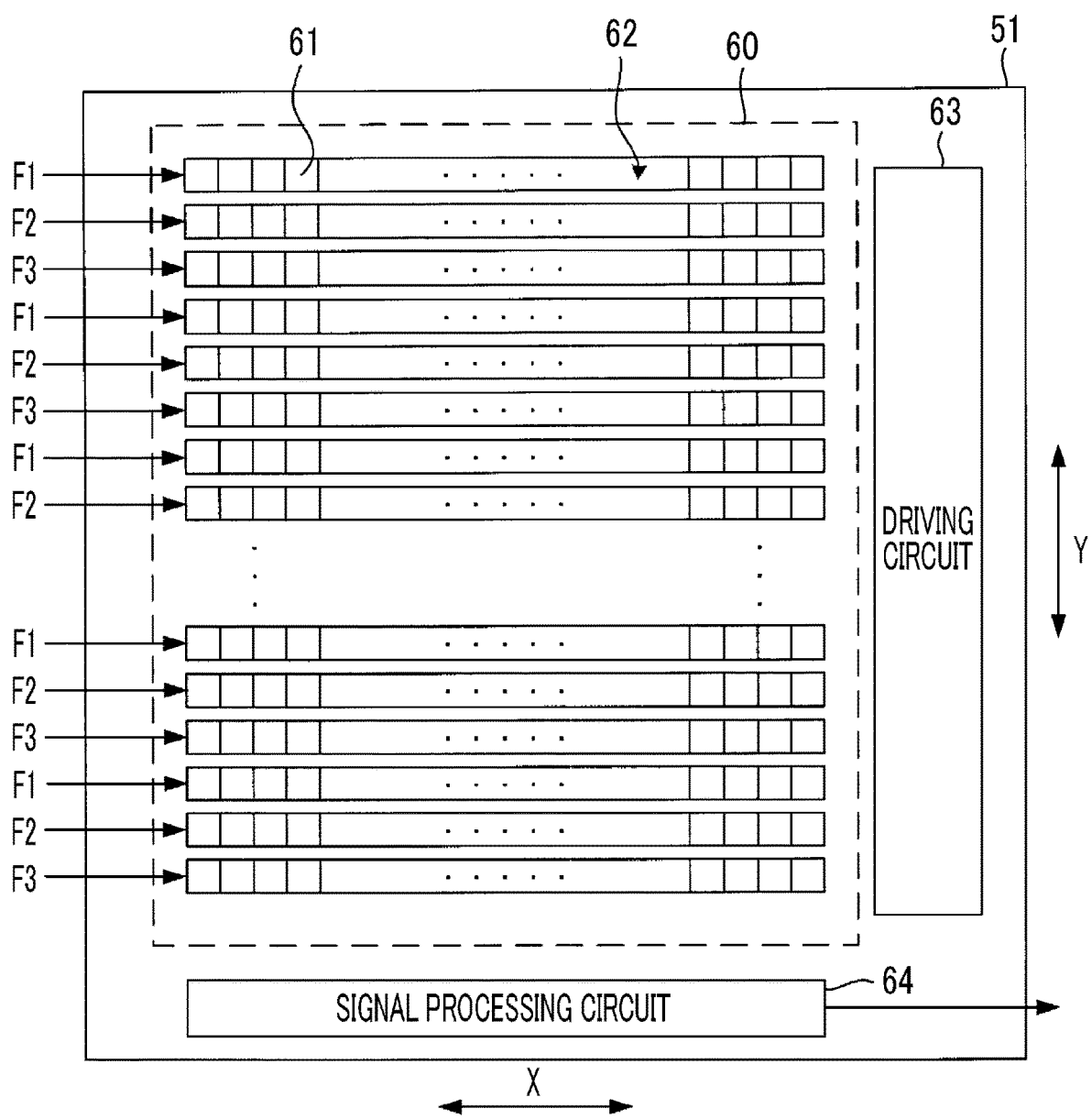
FIG. 3 is a schematic plan view illustrating a configuration of a sensor unit 51 of the imaging element 5 illustrated in FIG. 2.

FIG. 3 is a schematic plan view illustrating a configuration of the sensor unit 51 of the imaging element 5 illustrated in FIG. 2.

The sensor unit 51 comprises a light reception surface 60 in which a plurality of pixel rows 62 including a plurality of pixels 61 arranged in a row direction X which is one direction are arranged in a column direction Y orthogonal to the row direction X, a driving circuit 63 that drives the pixels arranged on the light reception surface 60, and a signal processing circuit 64 that processes an imaging signal read out from each pixel 61 of the pixel row 62 arranged on the light reception surface 60.

Hereinafter, an upward end in the column direction Y of the light reception surface 60 in FIG. 3 is referred to as an upper end, and a downward end in the column direction Y of the light reception surface 60 is referred to as a lower end.

The pixel 61 includes a photoelectric conversion unit that receives light passing through the imaging optical system of the lens device 40 and generates and accumulates charge according to the amount of received light, and a readout circuit that converts the charge accumulated in the photoelectric conversion unit into a voltage signal and reads the voltage signal as the imaging signal to a signal line. A well-known configuration can be adopted for the readout circuit.

The readout circuit includes, for example, a transfer transistor for transferring the charge accumulated in the photoelectric conversion unit to a floating diffusion, a reset transistor for resetting a potential of the floating diffusion, an output transistor that outputs a voltage signal according to the potential of the floating diffusion, and a selection transistor for selectively reading out the voltage signal output from the output transistor to the signal line. It should be noted that the readout circuit may be shared by a plurality of photoelectric conversion units.

An area on the light reception surface 60 on which a (3N+1)-th pixel row 62 from an upper end side of the light reception surface 60 with N being an integer equal to or greater than zero among all the pixel rows 62 disposed on the light reception surface 60 is disposed is a field F1.

The pixel 61 in the field F1 constitutes first pixels which are some of all the pixels 61 included in the sensor unit 51.

Hereinafter, a set of imaging signals read out from the respective pixels 61 in the field F1 to the signal line is referred to as a first captured image signal.

An area on the light reception surface 60 on which a (3N+2)-th pixel row 62 from an upper end side of the light reception surface 60 among all the pixel rows 62 disposed on the light reception surface 60 is disposed is a field F2.

An area on the light reception surface 60 on which a (3N+3)-th pixel row 62 from an upper end side of the light reception surface 60 among all the pixel rows 62 disposed on the light reception surface 60 is disposed is a field F3.

The pixel 61 in an area obtained by combining the field F2 and the field F3 constitutes second pixels which are pixels other than the first pixels among all the pixels 61 included in the sensor unit 51.

Hereinafter, a set of imaging signals read out from the respective pixels 61 in the field F2 and field F3 to the signal line is referred to as a second captured image signal.

The driving circuit 63 drives the readout circuit connected to the photoelectric conversion unit of each pixel 61 on a pixel row basis to perform, for example, resetting of each photoelectric conversion unit included in the pixel row 62 for each pixel row 62 and readout of a voltage signal according to charge accumulated in each photoelectric conversion unit to the signal line. The driving circuit 63 is controlled by the sensor driving unit 10.

The signal processing circuit 64 performs a correlative double sampling process on the voltage signal read out from each pixel 61 of the pixel row 62 to the signal line, converts the voltage signal after the correlative double sampling process into a digital signal, and outputs the digital signal from the sensor unit 51.

A processor of the system control unit 11 functions as an imaging control unit that performs still image exposure control, first readout control, and second readout control by executing a program including a still image capturing program.

The still image exposure control is control for controlling the sensor driving unit 10 in a state in which the mechanical shutter 3 is open via the lens control unit 4 and the shutter driving unit 6 (a state in which light is incident on the imaging optical system) to start the exposure of all the pixels 61 of the sensor unit 51 simultaneously and then end exposure of all the pixels 61 of the sensor unit 51 simultaneously by closing the mechanical shutter 3 via the lens control unit 4 and the shutter driving unit 6.

The first readout control is control for reading out the first captured image signal from all the pixels 61 in the field F1 at a plurality of respective timings during the exposure by controlling the sensor driving unit 10 during the exposure performed through the still image exposure control.

The second storage unit 52B has a capacity capable of storing the first captured image signal. The first captured image signal read out through the first readout control is stored in each of the first storage unit 52A and the second storage unit 52B.

The second storage unit 52B overwrites and stores the first captured image signal sequentially read out through the first readout control and always stores only the latest captured image signal.

That is, in a case in which a new first captured image signal is input in a state in which the second storage unit 52B stores the first captured image signal, the second storage unit 52B overwrites the imaging signal read out from the same pixel 61 as the pixel 61 that is a readout source of each imaging signal of the new first captured image signal on each captured image of the stored first captured image signal, thereby updating the first captured image signal with a new first captured image signal.

On the other hand, the first storage unit 52A integrates and stores the first captured image signals sequentially read out through the first readout control.

That is, in a case in which a new first captured image signal is input in a state in which the first storage unit 52A stores the first captured image signal, the first storage unit 52A integrates each imaging signal of the stored first captured image signal and the imaging signal read out from the same pixel 61 as the pixel 61 that is a readout source of each imaging signal of the new first captured image signal and stores an imaging signal after integration, thereby updating the first captured image signal.

Accordingly, the new first captured image signal is additionally stored with respect to the first captured image signal that has already been stored, in the first storage unit 52A.

The second readout control is control for reading out the first captured image signal from all the pixels 61 in the field F1 and reading out the second captured image signal from all the pixels 61 in the field F2 and the field F3 after completion of the exposure performed through the still image exposure control.

The first storage unit 52A stores the second captured image signal read out through the second readout control in an area other than the area in which the first captured image signal is stored.

Therefore, in a state in which the first readout control and the second readout control have ended, a third captured image signal including the first captured image signal and the second captured image signal is stored in the first storage unit 52A.

The processor of the digital signal processing unit 17 functions as a display control unit and an image processing unit by executing a still image capturing program stored in a ROM embedded in the digital signal processing unit 17.

The processor of the digital signal processing unit 17 functioning as a display control unit generates the live view image data on the basis of the first captured image signal sequentially read out through the first readout control, stored in the second storage unit 52B, and output from the second storage unit 52B to the data bus 25 by the transfer interface 53, and causes an image (a live view image) based on the live view image data to be displayed on the display unit 23 via the display driver 22.

The processor of the digital signal processing unit 17 functioning as the image processing unit processes the third captured image signal read out through the first readout control and the second readout control, stored in the first storage unit 52A, and output from the first storage unit 52A to the data bus 25 by the transfer interface 53 to generate captured image data, and stores the captured image data in the storage medium 21 via the external memory control unit 20.

Figure 4:
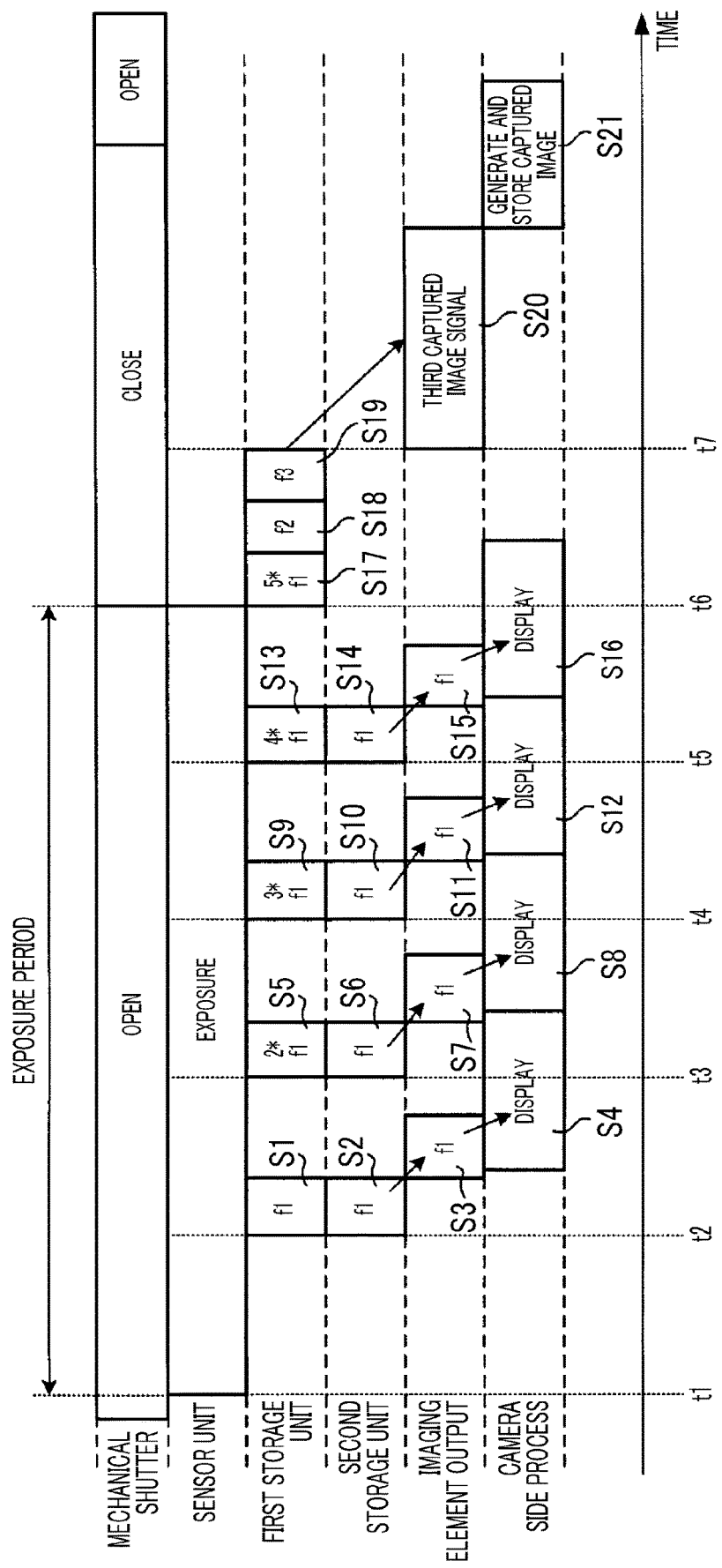
FIG. 4 is a timing chart schematically illustrating an operation of the digital camera 100 illustrated in FIG. 1 at the time of capturing of a still image.

FIG. 4 is a timing chart schematically illustrating an operation of the digital camera 100 illustrated in FIG. 1 at the time of capturing of a still image.

In FIG. 4, an open and close state of the mechanical shutter 3 is shown beside the "mechanical shutter".

In FIG. 4, an exposure timing for still image capturing performed by the sensor unit 51 is shown beside the "sensor unit".

In FIG. 4, a storage state of the imaging signal in the first storage unit 52A is shown beside the "first storage unit".

In FIG. 4, a storage state of the imaging signal in the second storage unit 52B is shown beside the "second storage unit".

In FIG. 4, an output state of the imaging signal from the imaging element 5 is shown beside the "imaging element output".

In FIG. 4, a process performed by the digital signal processing unit 17 is shown beside the "camera side process".

In a case in which the digital camera 100 is set to an imaging mode, the system control unit 11 issues a command to the lens control unit 4 so that the mechanical shutter 3 is open, and causes the imaging element 5 to perform imaging a for live view image display in this state. Accordingly, a live view image is displayed on the display unit 23.

In a case in which an instruction to perform still image capturing is issued in this state, the system control unit 11 controls the sensor driving unit 10 in response to this instruction to simultaneously reset all the pixels 61 of the sensor unit 51 (discharge of charge from the photoelectric conversion unit) and simultaneously start the exposure of all the pixels 61 (exposure according to still image exposure control) (time t1).

At time t2 during the exposure period started at time t1, the system control unit 11 controls the sensor driving unit 10 to perform the first readout control for reading out the imaging signal from each pixel 61 in the field F1 of the sensor unit 51.

The first captured image signal read out through the first readout control is stored in the first storage unit 52A (step S1) and stored in the second storage unit 52B (step S2).

In a case in which the storage of the first captured image signal in the second storage unit 52B is completed, the first captured image signal stored in the second storage unit 52B is output from the transfer interface 53 to the data bus 25 line by line under the control of the system control unit 11 (step S3).

Each line of the first captured image signal output to the data bus 25 in step S3 is sequentially stored in a line memory embedded in the digital signal processing unit 17 and processed so that the live view image data is generated line by line.

The digital signal processing unit 17 transfers one line of the generated live view image data to the display driver 22. The display driver 22 draws the received one line on the display unit 23. By repeating this process, the live view image based on the live view image data is displayed on the display unit 23 (step S4).

At time t3 after time t2, the system control unit 11 controls the sensor driving unit 10 to perform the first readout control for reading out the imaging signal from each pixel 61 in the field F1 of the sensor unit 51 again.

The first captured image signal read out through the first readout control is integrated with the first captured image signal stored in the first storage unit 52A in step S1, and additionally stored in the first storage unit 52A (step S5).

Further, the first captured image signal is overwritten on the first captured image signal stored in the second storage unit 52B in step S2 and stored in the second storage unit 52B (step S6).

In a case in which the process of step S6 is completed, the first captured image signal overwritten and stored in the second storage unit 52B is output from the transfer interface 53 to the data bus 25 line by line under the control of the system control unit 11 (step S7).

Each line of the first captured image signal output to the data bus 25 in step S7 is sequentially stored in the line memory embedded in the digital signal processing unit 17 and processed so that the live view image data is generated line by line.

The digital signal processing unit 17 transfers one line of the generated live view image data to the display driver 22. The display driver 22 draws the received one line on the display unit 23.

By repeating this process, the live view image that is being displayed in the process of step S4 is updated for each line (step S8).

At time t4 after time t3, the system control unit 11 controls the sensor driving unit 10 to perform the first readout control for reading out the imaging signal from each pixel 61 in the field F1 of the sensor unit 51 again.

The first captured image signal read out through the first readout control is integrated with the first captured image signal stored in the first storage unit 52A in step S5, and additionally stored in the first storage unit 52A (step S9).

Further, the first captured image signal is overwritten on the first captured image signal stored in the second storage unit 52B in step S6 and stored in the second storage unit 52B (step S10).

In a case in which the process of step S10 is completed, the first captured image signal overwritten and stored in the second storage unit 52B is output from the transfer interface 53 to the data bus 25 line by line under the control of the system control unit 11 (step S11).

Each line of the first captured image signal output to the data bus 25 in step S11 is sequentially stored in the line memory embedded in the digital signal processing unit 17 and processed so that the live view image data is generated line by line.

The digital signal processing unit 17 transfers one line of the generated live view image data to the display driver 22. The display driver 22 draws the received one line on the display unit 23.

By repeating this process, the live view image that is being displayed in the process of step S8 is updated for each line (step S12).

At time t5 after time t4, the system control unit 11 controls the sensor driving unit 10 to perform the first readout control for reading out the imaging signal from each pixel 61 in the field F1 of the sensor unit 51 again.

The first captured image signal read out through the first readout control is integrated with the first captured image signal stored in the first storage unit 52A in step S9, and additionally stored in the first storage unit 52A (step S13).

Further, the first captured image signal is overwritten on the first captured image signal stored in the second storage unit 52B in step S10 and stored in the second storage unit 52B (step S14).

In a case in which the process of step S14 is completed, the first captured image signal overwritten and stored in the second storage unit 52B is output from the transfer interface 53 to the data bus 25 line by line under the control of the system control unit 11 (step S15).

Each line of the first captured image signal output to the data bus 25 in step S15 is sequentially stored in the line memory embedded in the digital signal processing unit 17 and processed so that the live view image data is generated line by line.

The digital signal processing unit 17 transfers one line of the generated live view image data to the display driver 22. The display driver 22 draws the received one line on the display unit 23.

By repeating this process, the live view image that is being displayed in the process of step S12 is updated for each line (step S16).

At time t6 after time t5, the system control unit 11 controls the lens control unit 4 to close the mechanical shutter 3, thereby ending the exposure of all the pixels 61 of the sensor unit 51 started at time t1.

In a case in which the exposure according to the still image exposure control ends, the system control unit 11 controls the sensor driving unit 10 to first perform the first readout control for reading out the imaging signal from each pixel 61 in the field F1 of the sensor unit 51.

The first captured image signal read out through the first readout control is integrated with the first captured image signal stored in the first storage unit 52A in step S13, and additionally stored in the first storage unit 52A (step S17).

Through the process of steps S1, S5, S9, S13, and S17, an integrated value of a total of five first captured image signals including a first captured image signal obtained by the exposure between time t1 and time t2, a first captured image signal obtained by exposure between time t2 and time t3, a first captured image signal obtained by exposure between time t3 and time t4, a first captured image signal obtained by exposure between time t4 and time t5, and a first captured image signal obtained by exposure between time t5 and time t6 is stored in the first storage unit 52A.

This integrated value is a set of imaging signals according to charge accumulated in each pixel 61 in the field F1 of the sensor unit 51 due to the exposure between time t1 and time t6.

Next, the system control unit 11 controls the sensor driving unit 10 to perform the second readout control for reading out the imaging signal from each pixel 61 in the field F2 of the sensor unit 51. The captured image signal read out through the second readout control is stored in the first storage unit 52A (step S18).

Then, the system control unit 11 controls the sensor driving unit 10 to perform the second readout control for reading out the imaging signal from each pixel 61 in the field F3 of the sensor unit 51. The captured image signal read out through the second readout control is stored in the first storage unit 52A (step S19).

Through the processes of steps S17 to S19, the first captured image signal obtained by the exposure between time t1 and time t6 and the second captured image signal obtained by the exposure between time t1 and time t6 are stored in the first storage unit 52A, and a third captured image signal is composed of the first captured image signal and the second captured image signal.

The third captured image signal is equivalent to the captured image signal that is obtained by exposing all the pixels 61 of the sensor unit 51 from time t1 to time t6 without reading out the imaging signal midway, and reading out from all the pixels 61 after this exposure.

In a case in which the process of step S19 ends and the third captured image signal is stored in the first storage unit 52A, the third captured image signal stored in the first storage unit 52A is output line by line from the transfer interface 53 to the data bus 25 under the control of the system control unit 11 (step S20).

The third captured image signal output to the data bus 25 is sequentially stored in the line memory of the digital signal processing unit 17 and processed to thereby generate captured image data, and the generated captured image data is stored in the storage medium 21 (step S21).

Accordingly, the still image capturing is completed, imaging for a live view image display is restarted, and a display of the live view image is restarted.

As described above, according to the digital camera 100, the live view image is displayed on the basis of the first captured image signals read out from some of the pixels 61 of the sensor unit 51 during exposure for still image capturing. Accordingly, it is possible to continue to update the display of the live view image.

In addition, the first captured image signal used for generation of the live view image data is overwritten and stored in the second storage unit 52B. Therefore, quality of the live view image can be improved even in a case in which a subject under still image capturing is moving.

Time from time t1 to time t2, time from time t2 to time t3, time from time t3 to time t4, time from time t4 to time t5, and time from time t5 to time t6 are the same such that the first captured image signals used for generation of the live view image data can be all obtained with the same exposure time.

Therefore, it is not necessary to correct the brightness of the live view image displayed in each of steps S4, S8, S12, and S16 in FIG. 4, and the process can be simplified.

Further, according to the digital camera 100, the imaging signal is read out from only the pixels 61 in the field F1 during exposure. Thus, since the imaging signal is not read out from the pixels 61 in the fields F2 and F3 until the exposure ends, it is possible to reduce power consumption required for still image capturing, and lengthen battery durableness by the digital camera 100.

Further, according to the digital camera 100, the integrated value of the first captured image signal divided and read out a plurality of times during the exposure, and the second captured image signal read out after the exposure ends are stored in the first storage unit 52A.

The third captured image signal composed of the integrated value of the first captured image signal and the second captured image signal is equivalent to a signal obtained by exposing all the pixels 61 with the same exposure time.

Therefore, it is possible to achieve high-quality captured image data generated on the basis of the third captured image signal.

Further, according to the digital camera 100, a configuration in which the imaging element 5 includes the first storage unit 52A is adopted. Therefore, it becomes possible to start exposure for next still image capturing even during the output of the third captured image signal.

For example, in step S20, the first captured image signal stored in the first storage unit 52A in step S17 is first output, and then, the second captured image signal is output.

According to this configuration, a new first captured image signal can be stored in the first storage unit 52A at a point in time in a case in which the output of the first captured image signal stored in the first storage unit 52A ends. Therefore, it is possible to start next still image exposure control.

Thus, since it is possible to shorten a time from a time in a case in which still image capturing has been performed to a time in a case in which next still image capturing becomes possible, it is possible to reduce a possibility of shutter chance missing.

Further, according to the digital camera 100, a configuration in which the imaging element 5 includes the first storage unit 52A and the second storage unit 52B is adopted. Therefore, even in a case in which a transfer speed of the transfer interface 53 is low, it is possible to read out the first captured image signal at high speed under the exposure.

By reading out the first captured image signal under the exposure at high speed, it is possible to suppress distortion of the image based on this first captured image signal and improve the quality of the live view image and the captured image data even in a case in which a moving subject is being captured.

Although the first readout control is performed four times during the exposure for still image capturing in the description of FIG. 4, it is possible to appropriately update the live view display and improve the quality of the live view image in a case in which this number is equal to or greater than two.

Further, although the pixel from which the imaging signal is read out from the sensor unit 51 during the exposure is the pixel 61 in the field F1, a configuration in which the imaging signal is read output from the pixel 61 in the field F2 or the pixel 61 in the field F3 may be adopted.

Further, although the configuration in which the pixels 61 of the sensor unit 51 are divided into three fields is adopted, the number of divisions of the fields may be equal to or greater than two.

Figure 5:
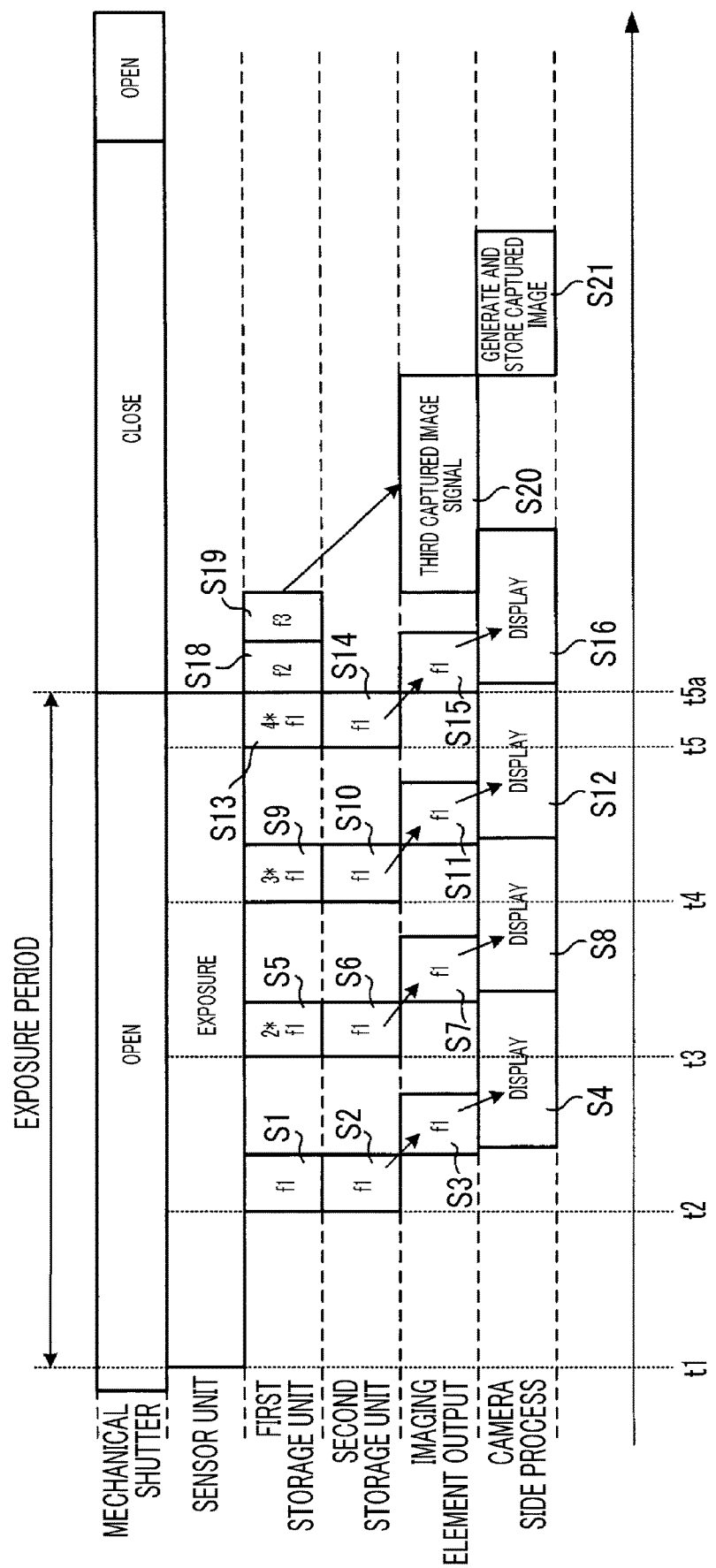
FIG. 5 is a timing chart schematically illustrating a modification example of an operation of the digital camera 100 illustrated in FIG. 1 at the time of capturing of a still image.

FIG. 5 is a timing chart schematically illustrating a modification example of an operation of the digital camera 100 illustrated in FIG. 1 at the time of capturing of a still image.

The timing chart illustrated in FIG. 5 is the same as the timing chart illustrated in FIG. 4 except that exposure for still image capturing ends at a timing (time t5a in FIG. 5) at which storage of the first captured image signal in the first storage unit 52A started in step S13 is completed, and that the process of step S17 performed after the end of the exposure is deleted.

Figure 6:
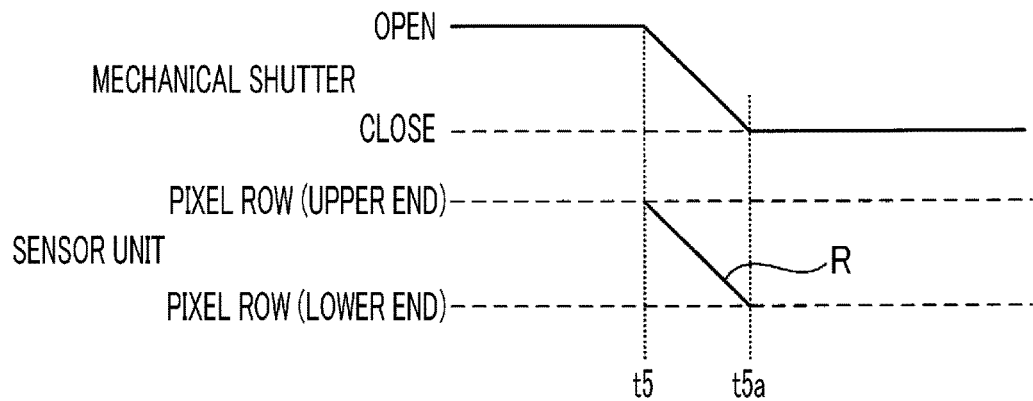
FIG. 6 is a diagram illustrating an operating state of a mechanical shutter 3 and a sensor unit 51 between time t5 and time t5a in the timing chart illustrated in FIG. 5.

FIG. 6 is a diagram illustrating an operation state of the mechanical shutter 3 and the sensor unit 51 from time t5 to time t5a in the timing chart illustrated in FIG. 5.

A straight line R illustrated in FIG. 6 indicates a timing of reading out an imaging signal from the pixel 61 in the field F1. From time t5 to time t5a, the pixel row 62 in the field F1 is sequentially selected from the upper end side to the lower end side of the light reception surface 60, and an imaging signal is read out from respective pixels 61 of the selected pixel row 62.

Further, in this example, the mechanical shutter 3 is configured to sequentially shield the light reception surface 60 from the upper end side to the lower end side.

The mechanical shutter 3 starts a closing operation at time t5 and moves the light reception surface 60 from the upper end side to the lower end side. The mechanical shutter 3 shields the entire light reception surface 60 at time t5a.

The time t5a illustrated in FIGS. 5 and 6 is a first timing at which the reading out of the first captured image signal is completed immediately before exposure for still image capturing ends, and is a second timing at which the mechanical shutter 3 is closed.

Thus, in a case in which the exposure time for still image capturing is an exposure time in which the first timing and the second timing match each other, the exposure of any pixel row 62 ends before the imaging signal is read out from the pixel row 62 in the field F1, after the imaging signal is read, or while this imaging signal is being read out from time t5 to time t5a.

Therefore, in a state in which the imaging signal from any pixel row 62 has been read, the pixel row 62 is not exposed and it is not necessary for the imaging signal to be read out from each pixel 61 of any pixel row 62 after the exposure period ends.

Therefore, as illustrated in FIG. 5, in a case in which the exposure period ends at time t5a, the system control unit 11 controls the sensor driving unit 10 to perform the second readout control for reading out the imaging signal from each pixel 61 in the field F2 of the sensor unit 51. The captured image signal read out through the second readout control is stored in the first storage unit 52A (step S18).

Then, the system control unit 11 controls the sensor driving unit 10 to perform the second readout control for reading out the imaging signal from each pixel 61 in the field F3 of the sensor unit 51. The captured image signal read out through the second readout control is stored in the first storage unit 52A (step S19). A subsequent process is as described in FIG. 4.

As described above, according to the operation example illustrated in FIG. 5, the imaging signal has been read out from the pixel 61 in the field F1 at a time in time at which the exposure for still image capturing ends. Therefore, it is possible to shorten a time to be taken until the captured image data is stored in the storage medium 21. Further, it is possible to further shorten a time until the next still image capturing becomes possible.

Figure 7:
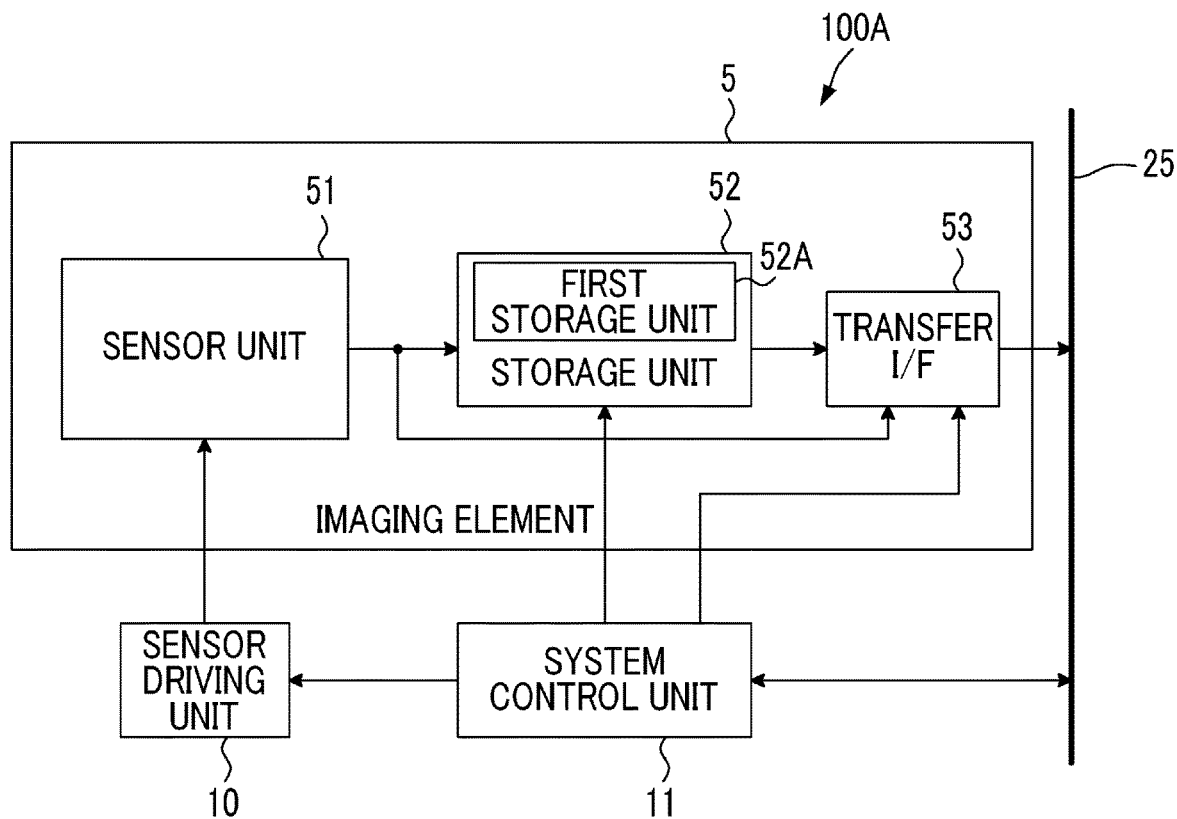
FIG. 7 is a diagram illustrating a main configuration of a digital camera 100A that is a modification example of the digital camera 100 illustrated in FIG. 1.

FIG. 7 is a diagram illustrating a main configuration of a digital camera 100A that is a modification example of the digital camera 100 illustrated in FIG. 1.

The digital camera 100A is the same as the digital camera 100 except that the storage unit 52 embedded in the imaging element 5 includes only the first storage unit 52A and that the imaging signal output from the sensor unit 51 is also input to the transfer interface 53.

In the digital camera 100A, imaging signals output from the sensor unit 51 at respective times t2 to t5 in FIG. 4 are stored in the first storage unit 52A and output from the transfer interface 53 to the data bus 25.

The digital signal processing unit 17 of the digital camera 100A processes the imaging signal that is output to the data bus 25 to generate live view image data, and causes the live view image based on the live view image data to be displayed on the display unit 23.

That is, an operation of the digital camera 100A at the time of capturing a still image is an operation in which in FIG. 4, steps S2, S6, S10, and S14 are deleted, a start timing of step S3 is changed to time t2, a start timing of step S7 is changed to time t3, a start timing of step S11 is changed to time t4, a start timing of step S15 is changed to time t5, and start timings of steps S4, S8, S12, and S16 are advanced according to such a change.

Thus, even in a configuration in which the second storage unit 52B is not included in the imaging element 5, it is possible to store high-quality still image data while continuing the display of the live view image during the exposure period. According to this configuration, it is possible to reduce a capacity of the storage unit 52 of the imaging element 5 and reduce a cost of the digital camera.

In addition, according to the digital camera 100A, since the imaging signal for a live view image display is output from the sensor unit 51 and then immediately transferred by the transfer interface 53, a high-speed process becomes possible and a display of the live view image can be performed smoothly.

Figure 8:
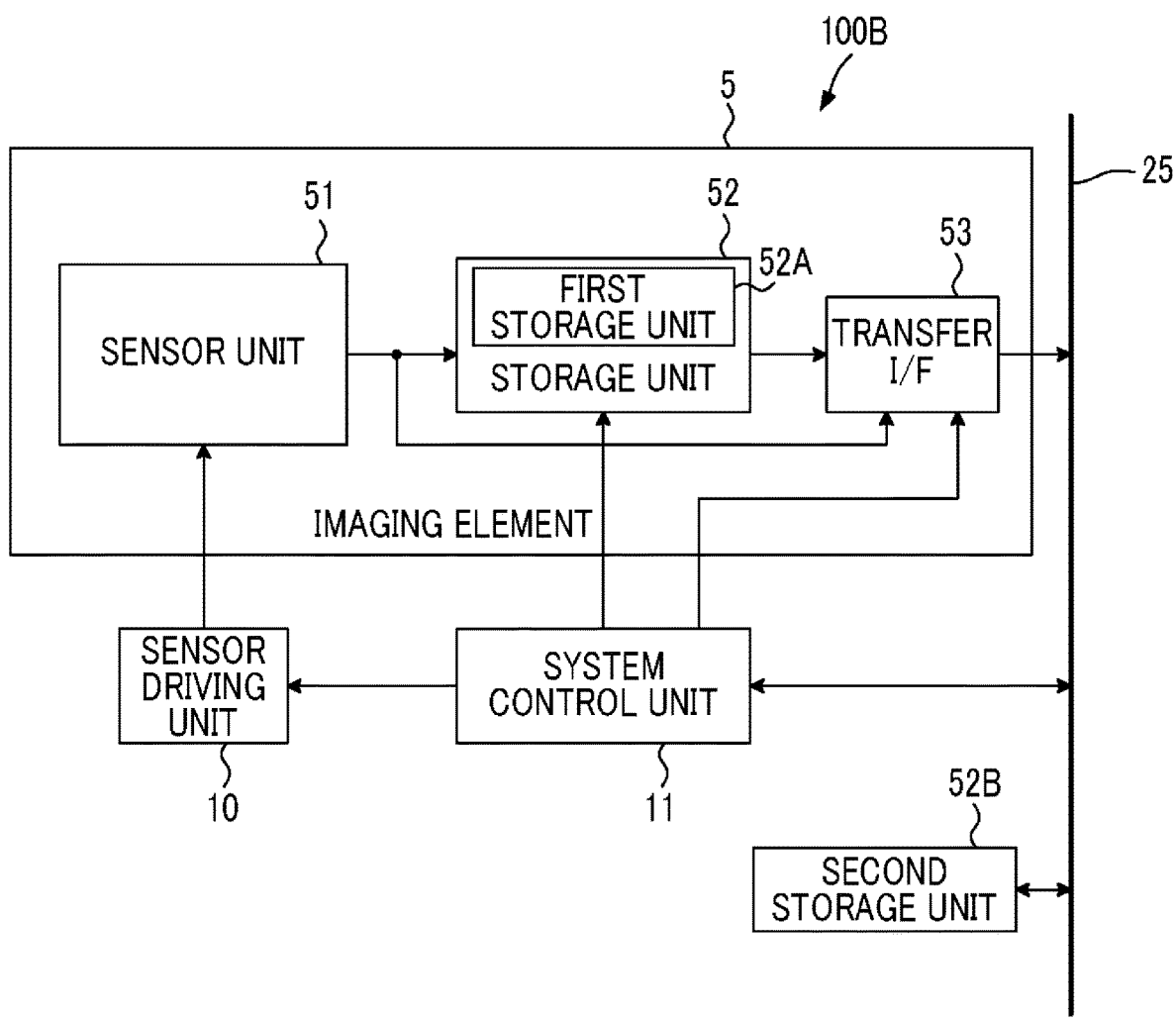
FIG. 8 is a diagram illustrating a main configuration of a digital camera 100B that is a modification example of the digital camera 100 illustrated in FIG. 1.

FIG. 8 is a diagram illustrating a main configuration of a digital camera 100B that is a modification example of the digital camera 100 illustrated in FIG. 1.

The digital camera 100B has the same configuration as the digital camera 100A in FIG. 7 except that the second storage unit 52B is provided outside the imaging element 5 and connected to the data bus 25.

In the digital camera 100B, imaging signals output from the sensor unit 51 at respective times t2 to t5 in FIG. 4 are stored in the first storage unit 52A, and are output from the transfer interface 53 to the data bus 25 and stored in the second storage unit 52B. In the second storage unit 52B, the first captured image signal is sequentially overwritten.

The digital signal processing unit 17 of the digital camera 100B processes the first captured image signal stored in the second storage unit 52B to generate live view image data, and causes the live view image based on the live view image data to be displayed on the display unit 23.

Further, according to the digital camera 100B, it is possible to perform complicated image processing using the second storage unit 52B on the first captured image signal. Therefore, it is possible to achieve a high-quality live view image.

Figure 9:
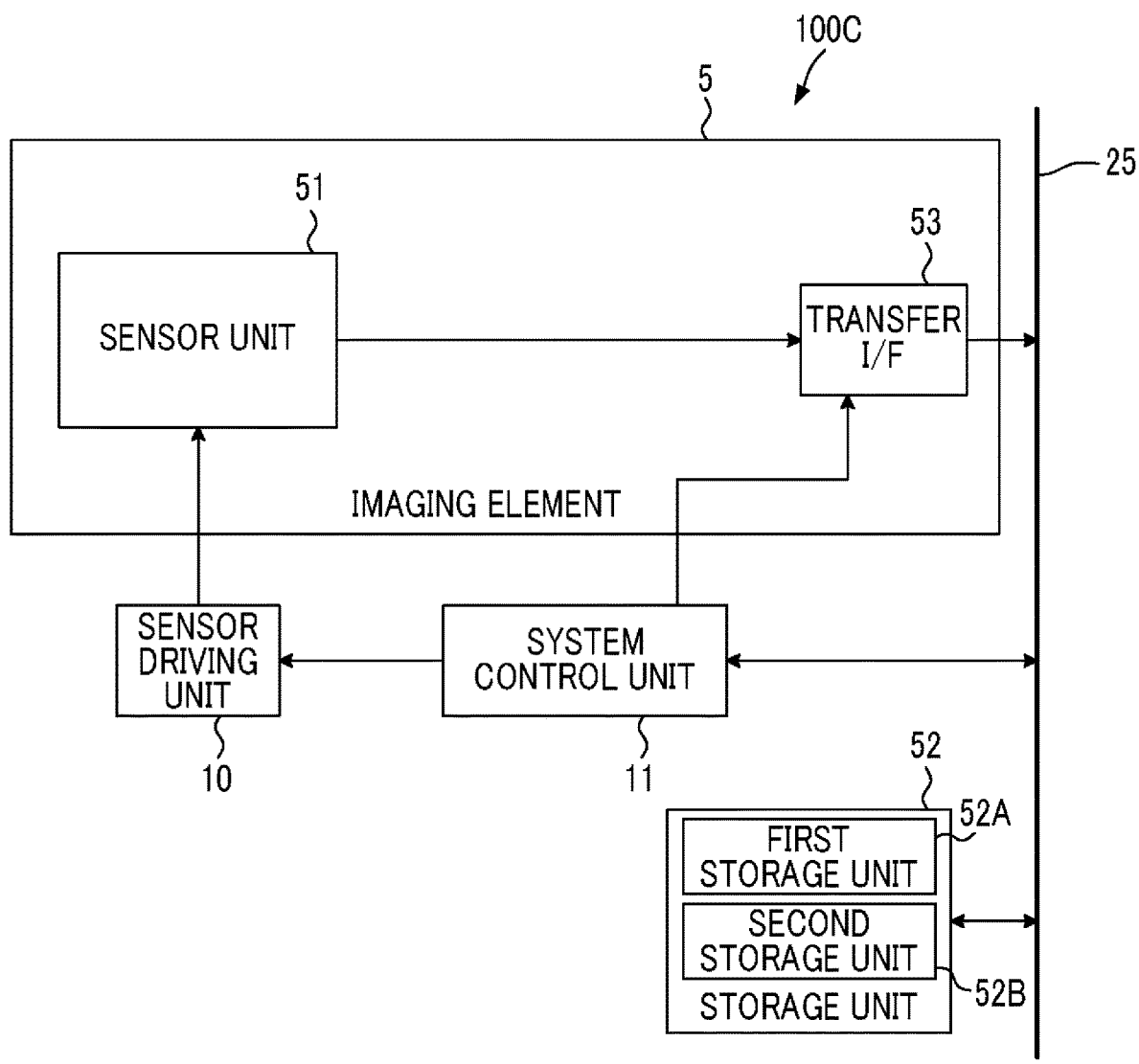
FIG. 9 is a diagram illustrating a main configuration of a digital camera 100C that is a modification example of the digital camera 100 illustrated in FIG. 1.

FIG. 9 is a diagram illustrating a main configuration of a digital camera 100C that is a modification example of the digital camera 100 illustrated in FIG. 1.

The digital camera 100C has the same configuration as the digital camera 100 of FIG. 1 except that the storage unit 52 is provided outside the imaging element 5 and connected to the data bus 25.

In the digital camera 100C, the first captured image signal read out from the pixel 61 in the field F1 of the sensor unit 51 during exposure is output from the transfer interface 53 to the data bus 25 and stored in the first storage unit 52A and the second storage unit 52B.

The first captured image signal is integrated and stored in the first storage unit 52A and the first captured image signal is overwritten and stored in the second storage unit 52B, similar to the digital camera 100.

Further, in the digital camera 100C, the first captured image signal read out from the pixels 61 in the field F1 of the sensor unit 51 after the end of the exposure is output from the transfer interface 53 to the data bus 25 and stored in the first storage unit 52A.

Further, in the digital camera 100C, the second captured image signal read out from the pixels 61 in the field F2 and the field F3 of the sensor unit 51 after the end of the exposure is output from the transfer interface 53 to the data bus 25 and stored in the first storage unit 52A. Accordingly, the third captured image signal is stored in the first storage unit 52A.

The digital signal processing unit 17 of the digital camera 100C processes the first captured image signal stored in the second storage unit 52B to generate live view image data, and causes the live view image based on the live view image data to be displayed on the display unit 23.

In addition, the digital signal processing unit 17 of the digital camera 100C processes the third captured image signal stored in the first storage unit 52A to generate captured image data, and stores the captured image data in the storage medium 21.

Thus, even in a configuration in which the storage unit 52 is not included in the imaging element 5, it is possible to store high-quality still image data while continuing the display of the live view image during the exposure period. According to this configuration, it is possible to reduce the cost of the imaging element 5 and provide the digital camera at a low price.

In addition, according to the digital camera 100C, since the imaging signal for a live view image display is output from the sensor unit 51 and then immediately transferred by the transfer interface 53, a high-speed process becomes possible and a display of the live view image can be performed smoothly.

Further, according to the digital camera 100C, since complicated image processing using the second storage unit 52B can be performed on the first captured image signal, it is possible to achieve a high-quality live view image.

Figure 10:
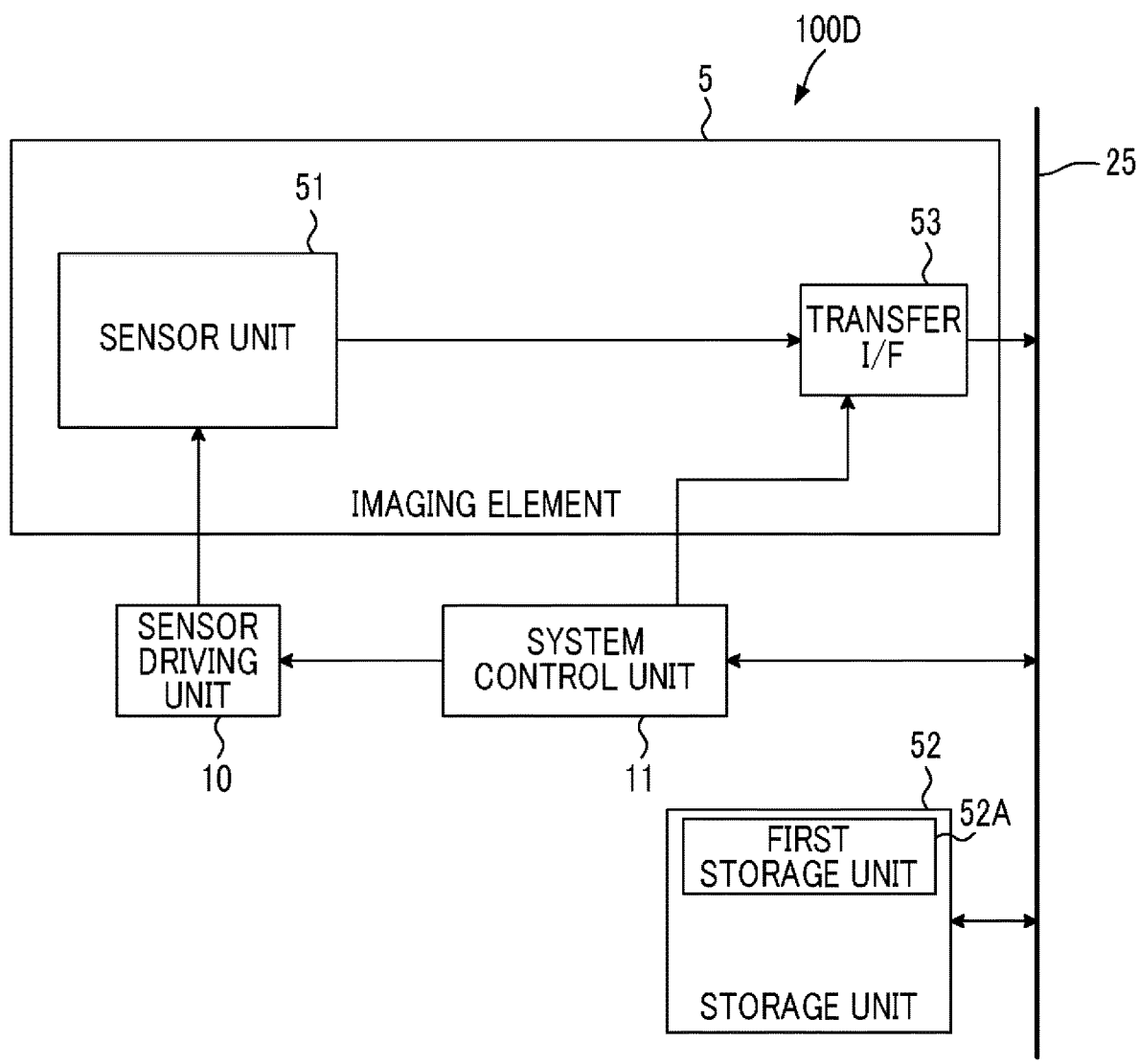
FIG. 10 is a diagram illustrating a main configuration of a digital camera 100D that is a modification example of the digital camera 100 illustrated in FIG. 1.

FIG. 10 is a diagram illustrating a main configuration of a digital camera 100D that is a modification example of the digital camera 100 illustrated in FIG. 1.

The digital camera 100D has the same configuration as the digital camera 100C in FIG. 9 except that the storage unit 52 provided outside the imaging element 5 includes only the first storage unit 52A.

In the digital camera 100D, the first captured image signal read out from the pixel 61 in the field F1 of the sensor unit 51 during exposure is output from the transfer interface 53 to the data bus 25 and stored in the first storage unit 52A, and is also sequentially stored in the line memory of the digital signal processing unit 17.

The digital signal processing unit 17 of the digital camera 100D processes the first captured image signal sequentially stored in the line memory to generate live view image data, and causes the live view image based on the live view image data to be displayed on the display unit 23.

According to the digital camera 100D, it is possible to reduce a cost of the storage unit 52 and to provide a digital camera at low cost.

The digital camera has been described as an example of the imaging device so far. Hereinafter, an embodiment of a smartphone with a camera will be described as the imaging device.

Figure 11:
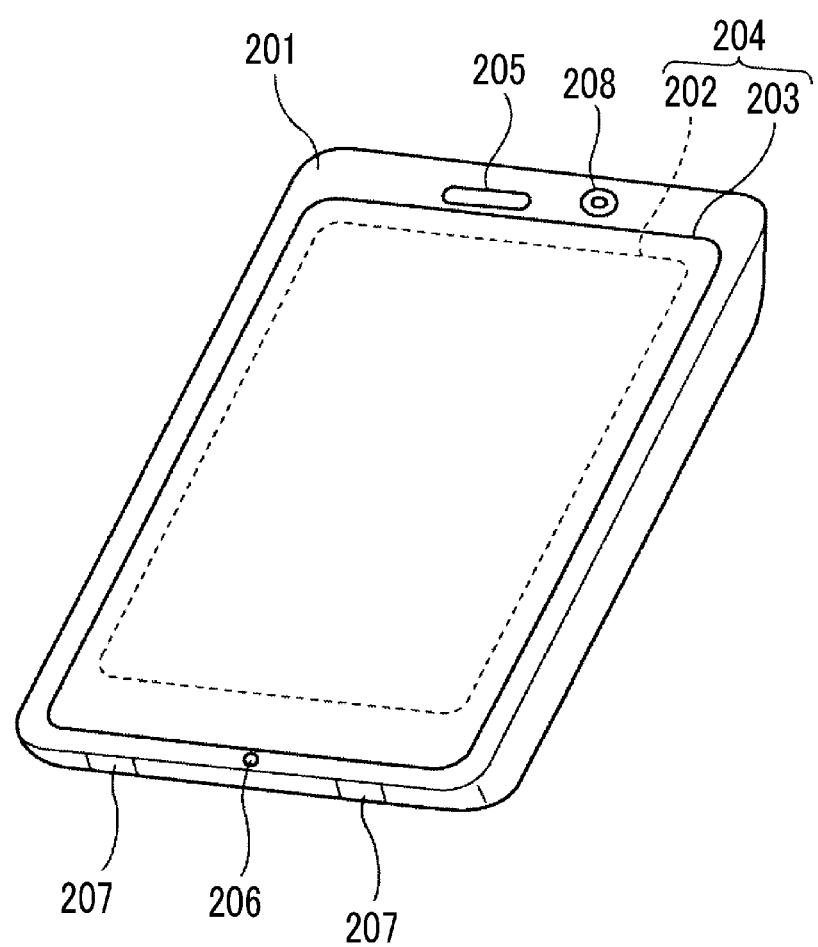
FIG. 11 illustrates an appearance of a smartphone 200 which is an embodiment of the imaging device of the present invention.

FIG. 11 shows an appearance of a smartphone 200 which is an embodiment of the imaging device of the present invention.

The smartphone 200 illustrated in FIG. 11 has a flat casing 201, and comprises a display input unit 204 in which a display panel 202 as a display unit and a manipulation panel 203 as an input unit are integrally formed on one surface of the casing 201.

Further, such a casing 201 comprises a speaker 205, a microphone 206, a manipulation unit 207, and a camera unit 208.

It should be noted that a configuration of the casing 201 is not limited thereto. For example, a configuration in which the display unit and the input unit are independent can be adopted, or a configuration having a folding structure or a sliding mechanism can be adopted.

Figure 12:
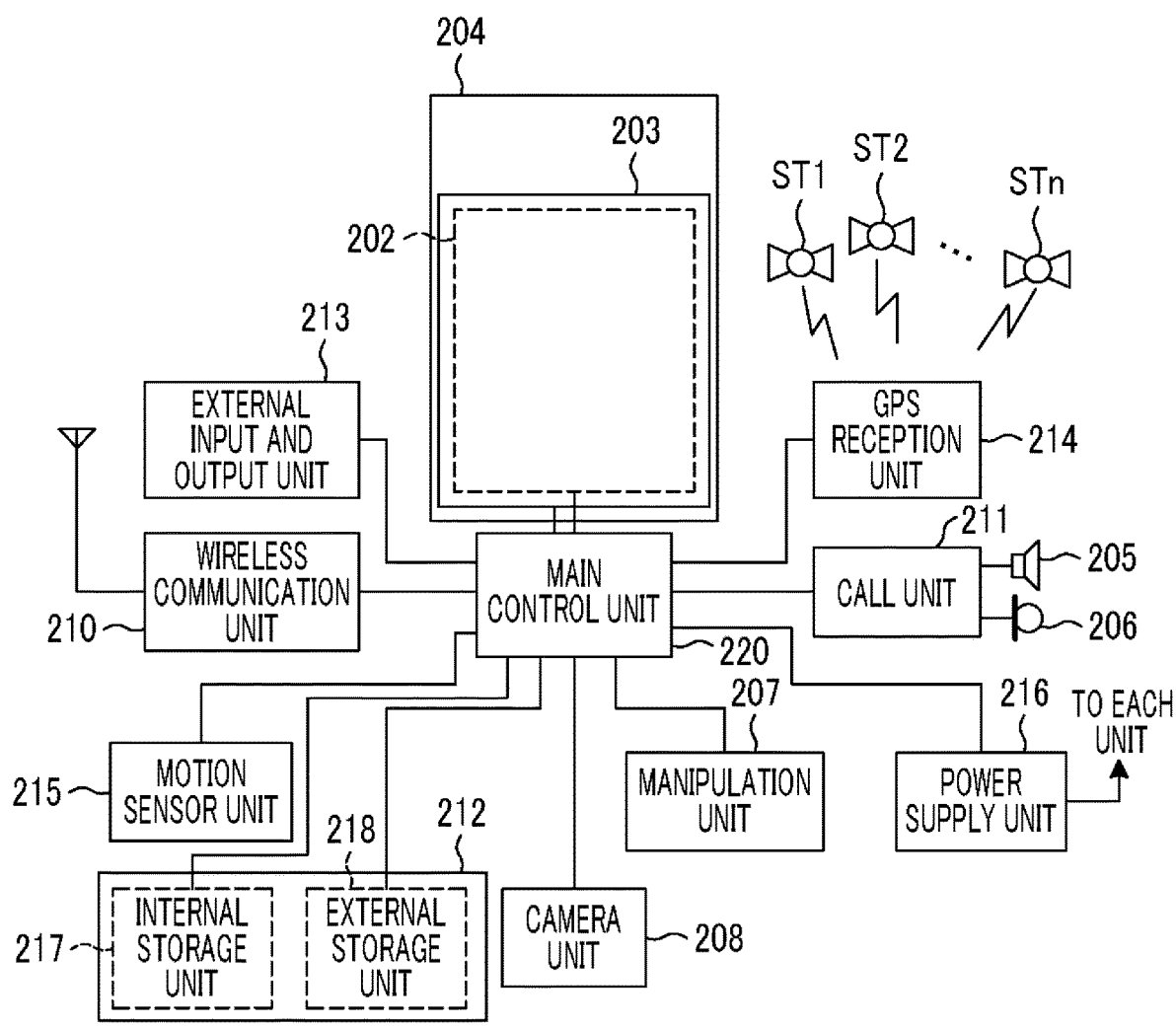
FIG. 12 is a block diagram illustrating a configuration of the smartphone 200 illustrated in FIG. 11.

FIG. 12 is a block diagram illustrating a configuration of the smartphone 200 illustrated in FIG. 11.

As illustrated in FIG. 12, the smartphone comprises, as main components, a wireless communication unit 210, a display input unit 204, a call unit 211, a manipulation unit 207, a camera unit 208, a storage unit 212, an external input and output unit 213, a global positioning system (GPS) reception unit 214, a motion sensor unit 215, a power supply unit 216, and a main control unit 220.

In addition, the smartphone 200 includes, as a main function, a wireless communication function of performing mobile wireless communication via a base station device BS (not shown) and a mobile communication network NW (not shown).

The wireless communication unit 210 performs wireless communication with the base station device BS accommodated in the mobile communication network NW according to an instruction from the main control unit 220. Using the wireless communication, the wireless communication unit 210 performs transmission and reception of various types of file data such as audio data and image data, e-mail data, or the like, or reception of web data, streaming data, or the like.

The display input unit 204 is a so-called touch panel that displays an image (a still image or a moving image), text information, or the like to visually transfer information to the user, and detects a user manipulation with respect to the displayed information under the control of the main control unit 220, and comprises a display panel 202 and a manipulation panel 203.

For the display panel 202, a liquid crystal display (LCD), an organic electro-luminescence display (OELD), or the like is used as a display device.

The manipulation panel 203 is a device that is placed so that an image displayed on the display surface of the display panel 202 can be visually recognized, and detects one or a plurality of coordinates, which is manipulated by a finger of a user or a stylus. In a case in which this device is manipulated by the finger of the user or the stylus, a detection signal generated due to the manipulation is output to the main control unit 220. Then, the main control unit 220 detects a manipulation position (coordinates) on the display panel 202 on the basis of the received detection signal.

As illustrated in FIG. 11, the display panel 202 and the manipulation panel 203 of the smartphone 200 illustrated as an embodiment of the imaging device of the present invention are integrated to constitute the display input unit 204, but the manipulation panel 203 is disposed to completely cover the display panel 202.

In a case in which such a disposition has been adopted, the manipulation panel 203 may also have a function of detecting a user manipulation in an area outside the display panel 202. In other words, the manipulation panel 203 may include a detection area (hereinafter referred to as a display area) for an overlapping portion overlapping the display panel 202, and a detection area (hereinafter referred to as a non-display area) for an outer edge portion not overlapping the display panel 202 other than the display area.

It should be noted that although a size of the display area may perfectly match a size of the display panel 202, it is not always necessary to match the size of the display area with the size of the display panel 202. In addition, the manipulation panel 203 may include two sensitive areas including an outer edge portion and an inner portion other than the outer edge portion. Further, a width of the outer edge portion is appropriately designed according to a size of the casing 201, or the like.

Furthermore, examples of a position detection scheme adopted in the manipulation panel 203 may include a matrix switching scheme, a resistive film scheme, a surface acoustic wave scheme, an infrared scheme, an electromagnetic induction scheme, and a capacitive scheme, and any one of the schemes can also be adopted.

The call unit 211 comprises a speaker 205 or a microphone 206, converts a voice of the user input through the microphone 206 into audio data that can be processed by the main control unit 220, and outputs the audio data to the main control unit 220 or decodes audio signal received by the wireless communication unit 210 or the external input and output unit 213 and outputs the decoded audio data from the speaker 205.

Further, as illustrated in FIG. 11, for example, the speaker 205 can be mounted on the same surface as a surface on which the display input unit 204 is provided, and the microphone 206 can be mounted on a side surface of the casing 201.

The manipulation unit 207 is a hardware key using a key switch or the like, and receives an instruction from the user. For example, as illustrated in FIG. 11, the manipulation unit 207 is a push button type switch that is mounted on the side face of the casing 201 of the smartphone 200, is turned on in a case in which the manipulation unit 207 is pressed by a finger or the like, and is turned off by a restoring force of a spring or the like in a case in which the finger is released.

The storage unit 212 stores a control program or control data of the main control unit 220, application software, address data associating a name, a telephone number, or the like of a communication partner, transmitted or received data of an e-mail, web data downloaded by web browsing, and downloaded content data, and temporarily stores streaming data or the like. Further, the storage unit 212 includes an internal storage unit 217 built in the smartphone and an external storage unit 218 having a slot for detachable external memory.

It should be noted that the internal storage unit 217 and the external storage unit 218 constituting the storage unit 212 are realized by a storage medium such as a flash memory type, hard disk type, multimedia card micro type, or card type of memory (for example, a MicroSD (registered trademark) memory), a random access memory (RAM), or a read only memory (ROM).

The external input and output unit 213 serves as an interface with all external devices connected to the smartphone 200, and is a unit for direct or indirect connection to other external devices through communication (for example, universal serial bus (USB) or IEEE 1394) or a network (for example, the Internet, a wireless LAN, Bluetooth (registered trademark), radio frequency identification (RFID), infrared communication (infrared data association: IrDA) (registered trademark), ultra wide band (UWB) (registered trademark), or ZigBee (registered trademark)).

Examples of the external devices connected to the smartphone 200 include a wired/wireless headset, a wired/wireless external charger, a wired/wireless data port, a memory card or a subscriber identity module (SIM)/user identity module (UIM) card connected via a card socket, an external audio and video device connected via an audio and video input/output (I/O) terminal, an external audio and video device that is connected wirelessly, a smartphone connected by a cable/wirelessly, a personal computer connected by a cable/wirelessly, a PDA connected by a cable/wirelessly, and an earphone connected by a cable/wirelessly.

The external input and output unit 213 transfers data transmitted from such an external device to internal components of the smartphone 200 or transfers data inside the smartphone 200 to the external device.

According to an instruction from the main control unit 220, the GPS reception unit 214 receives GPS signals transmitted from GPS satellites ST1 to STn, and executes a positioning calculation process based on the plurality of received GPS signals to calculate a position represented by a latitude, longitude, and altitude of the smartphone 200.

In a case in which position information can be acquired from the wireless communication unit 210 or the external input and output unit 213 (for example, a wireless LAN), the GPS reception unit 214 can also detect the position using the position information.

The motion sensor unit 215 comprises, for example, a three-axis acceleration sensor or the like, and detects a physical movement of the smartphone 200 according to an instruction from the main control unit 220. By detecting the physical movement of the smartphone 200, a moving direction or an acceleration of the smartphone 200 is detected. A result of the detection is output to the main control unit 220.

The power supply unit 216 supplies power accumulated in a battery (not illustrated) to each unit of the smartphone 200 according to an instruction from the main control unit 220.

The main control unit 220 comprises a microprocessor, operates according to a control program or control data stored in the storage unit 212, and totally controls each unit of the smartphone 200.

In addition, the main control unit 220 includes a mobile communication control function of controlling each unit of the communication system and an application processing function in order to perform audio communication or data communication through the wireless communication unit 210.

The application processing function is realized by the main control unit 220 operating according to the application software stored in the storage unit 212.

Examples of the application processing function include an infrared communication function of controlling the external input and output unit 213 to perform data communication with an opposite device, an e-mail function of transmitting and receiving an e-mail, and a web browsing function of browsing a web page.

Further, the main control unit 220 includes an image processing function such as displaying an image on the display input unit 204 on the basis of image data (data of a still image or moving image) such as received data or downloaded streaming data.

The image processing function is a function of the main control unit 220 decoding the image data, applying image processing to a result of the decoding, and displaying the image on the display input unit 204.

Further, the main control unit 220 executes display control for the display panel 202 and manipulation detection control for detecting a user manipulation through the manipulation unit 207 and manipulation panel 203. Through the execution of the display control, the main control unit 220 displays a window for displaying a software key such as an icon or a scroll bar for activating application software or creating an e-mail.

It should be noted that, with respect to, for example, a large image which does not fit to a display area of the display panel 202, the scroll bar is a software key for receiving an instruction to move a display unit of an image.

Further, through execution of the manipulation detection control, the main control unit 220 detects a user manipulation through the manipulation unit 207, receives a manipulation with respect to the icon or an input of a character string to an input field of the window through the manipulation panel 203, or receives a scroll request of a display image through the scroll bar.

Furthermore, through the execution of the manipulation detection control, the main control unit 220 includes a touch panel control function of determining whether a position of a manipulation with respect to the manipulation panel 203 is in the overlapping portion (the display area) overlapping the display panel 202 or in the outer edge portion (the non-display area) not overlapping the display panel 202, other than the display area, and controlling a sensitive area of the manipulation panel 203 or a display position of the software key.

Further, the main control unit 220 can detect a gesture manipulation with respect to the manipulation panel 203 and execute a preset function according to the detected gesture manipulation. The gesture manipulation is not a simple touch manipulation in the related art, but is a manipulation for drawing a trajectory with respect to at least one of a plurality of positions by drawing a trajectory with a finger or the like, by designating a plurality of positions simultaneously, or in a combination thereof.

The camera unit 208 includes configurations other than the external memory control unit 20, the storage medium 21, the display unit 23, the display driver 22, and the manipulation unit 14 in the digital camera illustrated in FIG. 1.

The captured image data generated by the camera unit 208 can be stored in the storage unit 212 or output via the external input and output unit 213 or the wireless communication unit 210.

In the smartphone 200 illustrated in FIG. 11, the camera unit 208 is mounted on the same surface as the display input unit 204, but a mounting position of the camera unit 208 is not limited thereto and may be mounted on a back surface of the display input unit 204.

In addition, the camera unit 208 can be used for various functions of the smartphone 200. For example, an image acquired by the camera unit 208 can be displayed on the display panel 202. The image of the camera unit 208 can be used as one of manipulation inputs of the manipulation panel 203.

Further, in a case in which the GPS reception unit 214 detects the position, the GPS reception unit 214 can detect the position by referring to the image from the camera unit 208. Further, by referring to the image from the camera unit 208, it is possible to determine an optical axis direction of the camera unit 208 of the smartphone 200 without using a triaxial acceleration sensor or in combination with the triaxial acceleration sensor or determine a current use environment. It is obvious that the image from the camera unit 208 can be used in application software.

In addition, the position information acquired by the GPS reception unit 214, the audio information acquired by the microphone 206 (which may be text information obtained through audio-text conversion in the main control unit or the like), the posture information acquired by the motion sensor unit 215, or the like may be added to the image data of the still image or the moving image and stored in the storage unit 212 or output via the external input and output unit 213 or the wireless communication unit 210.

As described above, the following matters are disclosed in the present specification.

(1) An imaging device comprising a MOS type imaging element including a plurality of pixels; a mechanical shutter disposed in front of the imaging element; a driving unit that drives the imaging element; an imaging control unit that performs still image exposure control for controlling the driving unit in a state in which the mechanical shutter is open to simultaneously start exposure of the plurality of pixels and closing the mechanical shutter to simultaneously end the exposure of the plurality of pixels, first readout control for controlling the driving unit during the exposure to read out a first captured image signal from first pixels of some of the plurality of pixels at each of a plurality of timings during the exposure, and second readout control for reading out, after the exposure ends, a second captured image signal from at least second pixels other than the first pixels among the plurality of pixels from among the first pixels and the second pixels; a display control unit that generates live view image data on the basis of the first captured image signal sequentially read out from the first pixels through the first readout control and causes an image based on the live view image data to be displayed on a display unit; a first storage unit that integrates and stores the first captured image signal sequentially read out from the first pixels through at least the first readout control between the first readout control and the second readout control, and stores the second captured image signal read out from the second pixels through the second readout control; and an image processing unit that processes a third captured image signal composed of the first captured image signal and the second captured image signal stored in the first storage unit to generate captured image data and stores the captured image data in a storage medium.

(2) The imaging device according to (1), in which the imaging control unit performs control for reading out the first captured image signal from the first pixels and reading out the second captured image signal from the second pixels as the second readout control in a case in which a first timing at which the first captured image signal has been read out immediately before the exposure ends and a second timing at which the mechanical shutter is closed do not match each other, and performs control for reading out the second captured image signal from only the second pixels as the second readout control in a case in which the first timing and the second timing match each other.

(3) The imaging device according to (1) or (2), in which the first storage unit is embedded in the imaging element.

(4) The imaging device according to any one of (1) to (3) further comprising: a second storage unit outside the imaging element, the second storage unit storing the first captured image signal sequentially read out from the first pixels while overwriting the first captured image signal through the first readout control, in which the display control unit processes the first captured image signal stored in the second storage unit to generate the live view image data.

(5) The imaging device according to any one of (1) to (3), in which the imaging element includes a second storage unit that stores the first captured image signal sequentially read out from the first pixels while overwriting the first captured image signal through the first readout control, and a transfer unit that transfers the first captured image signal stored in the second storage unit to the display control unit.

(6) A still image capturing method of an imaging device including a MOS type imaging element including a plurality of pixels, a mechanical shutter disposed in front of the imaging element, and a driving unit that performs driving for reading out an imaging signal from the pixels, the still image capturing method comprising a still image exposure control step of controlling the driving unit in a state in which the mechanical shutter is open to start exposure of the plurality of pixels simultaneously and closing the mechanical shutter to end the exposure of the plurality of pixels simultaneously; a first readout control step of controlling the driving unit during the exposure to read out a first captured image signal from first pixels of some of the plurality of pixels at each of a plurality of timings during the exposure; a second readout control step of controlling the driving unit after the exposure ends to read out a second captured image signal from at least second pixels other than the first pixels among the plurality of pixels from among the first pixels and the second pixels; a display control step of generating live view image data on the basis of the first captured image signal sequentially read out from the first pixels in the first readout control step and causing an image based on the live view image data to be displayed on a display unit; a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and an image processing step of processing a third captured image signal composed of the first captured image signal and the second captured image signal stored in the first storage unit to generate captured image data and storing the captured image data in a storage medium.

(7) The still image capturing method according to (6), in which the second readout control step includes reading out the first captured image signal from the first pixels and reading out the second captured image signal from the second pixels after the exposure ends in a case in which a first timing at which the first captured image signal has been read out immediately before the exposure ends and a second timing at which the mechanical shutter is closed do not match each other, and reading out the second captured image signal from only the second pixels after the exposure ends in a case in which the first timing and the second timing match each other.

(8) The still image capturing method according to (6) or (7), in which the first storage unit is embedded in the imaging element.

(9) The still image capturing method according to any one of (6) to (8), in which the imaging device further comprises a second storage unit outside the imaging element, the second storage unit storing the first captured image signal sequentially read out from the first pixels while overwriting the first captured image signal in the first readout control step, and the display control step includes processing the first captured image signal stored in the second storage unit to generate the live view image data.

(10) The still image capturing method according to any one of (6) to (8), in which the imaging element includes a second storage unit that stores the first captured image signal sequentially read out from the first pixels in the first readout control step while overwriting the first captured image signal; and a transfer unit that outputs the first captured image signal stored in the second storage unit.

(11) A still image capturing program causing an imaging device including a MOS type imaging element including a plurality of pixels, a mechanical shutter disposed in front of the imaging element, and a driving unit that performs driving for reading out an imaging signal from the pixels to execute: a still image exposure control step of controlling the driving unit in a state in which the mechanical shutter is open to start exposure of the plurality of pixels simultaneously and closing the mechanical shutter to end the exposure of the plurality of pixels simultaneously; a first readout control step of controlling the driving unit during the exposure to read a first captured image signal from first pixels of some of the plurality of pixels at each of a plurality of timings during the exposure; a second readout control step of controlling the driving unit after the exposure ends to read out a second captured image signal from at least second pixels other than the first pixels among the plurality of pixels from among the first pixels and the second pixels; a display control step of generating live view image data on the basis of the first captured image signal sequentially read out from the first pixels in the first readout control step and causing an image based on the live view image data to be displayed on a display unit; a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and an image processing step of processing a third captured image signal composed of the first captured image signal and the second captured image signal stored in the first storage unit to generate captured image data and storing the captured image data in a storage medium.

According to the present invention, it is possible to provide an imaging device capable of recording high-quality still image data while enabling a live view image to continue to be displayed during still image capturing.

Although the present invention has been described with reference to specific embodiments, the present invention is not limited to the embodiments, and various modifications are possible without departing from the technical spirit of the disclosed invention.

This application is based on Japanese patent application (Japanese Patent Application No. 2016-196539) filed Oct. 4, 2016, the content of which is incorporated herein. Explanation of References 100, 100A, 100B, 100C, 100D: digital camera
1: imaging lens
2: aperture
3: mechanical shutter
4: lens control unit
5: imaging element
6: shutter driving unit
8: lens driving unit
9: aperture driving unit
40: lens device
51: sensor unit
52: storage unit
52A: first storage unit
52B: second storage unit
53: transfer interface
60: light reception surface
61: pixel
62: pixel row
63: driving circuit
64: signal processing circuit
X: row direction
Y: column direction
F1 to F3: field
10: sensor driving unit
11: system control unit
14: manipulation unit
17: digital signal processing unit
20: external memory control unit
21: storage medium
22: display driver
23: display unit
24: control bus
25: data bus
R: straight line indicating readout timing
200: smartphone
201: casing
202: display panel
203: manipulation Panel
204: display input unit
205: speaker
206: microphone
207: manipulation unit
208: camera unit
210: wireless communication unit
211: call unit
212: storage unit
213: external input and output unit
214: GPS reception unit
215: motion sensor unit
216: power supply unit
217: internal storage unit
218: external storage unit
220: main control unit
ST1 to STn: GPS satellite

What is claimed is:

1. An imaging device comprising:
a MOS type imaging element comprising a plurality of pixels;
a mechanical shutter disposed in front of the imaging element;
a driving unit that drives the imaging element;
an imaging control unit that performs still image exposure control for controlling the driving unit in a state in which the mechanical shutter is open to simultaneously start exposure of the plurality of pixels and closing the mechanical shutter to simultaneously end the exposure of the plurality of pixels, first readout control for controlling the driving unit during the exposure to read out a first captured image signal from first pixels included in the plurality of pixels at each of a plurality of timings during the exposure, and second readout control for reading out, after the exposure ends, a second captured image signal from at least second pixels included in the plurality of pixels and being other than the first pixels from among the first pixels and the second pixels;
a display control unit that generates live view image data based on the first captured image signal sequentially read out from the first pixels through the first readout control and causes an image based on the live view image data to be displayed on a display unit;
a first storage unit that integrates and stores the first captured image signal sequentially read out from the first pixels through at least the first readout control among the first readout control and the second readout control, and stores the second captured image signal read out from the second pixels through the second readout control; and
an image processing unit that processes a third captured image signal comprising the first captured image signal and the second captured image signal stored in the first storage unit to generate captured image data and stores the captured image data in a storage medium, wherein the imaging control unit performs control for reading out the first captured image signal from the first pixels and reading out the second captured image signal from the second pixels as the second readout control in a case in which a first timing at which the reading out of the first captured image signal is completed immediately before the exposure ends and a second timing at which the mechanical shutter is closed do not match each other, and performs control for reading out the second captured image signal from only the second pixels as the second readout control in a case in which the first timing and the second timing match each other.

2. An imaging device comprising:
a MOS type imaging element comprising a plurality of pixels;
a mechanical shutter disposed in front of the imaging element;
a driving unit that drives the imaging element;
an imaging control unit that performs still image exposure control for controlling the driving unit in a state in which the mechanical shutter is open to simultaneously start exposure of the plurality of pixels and closing the mechanical shutter to simultaneously end the exposure of the plurality of pixels, first readout control for controlling the driving unit during the exposure to read out a first captured image signal from first pixels included in the plurality of pixels at each of a plurality of timings during the exposure, and second readout control for reading out, after the exposure ends, a second captured image signal from at least second pixels included in the plurality of pixels and being other than the first pixels from among the first pixels and the second pixels;
a display control unit that generates live view image data based on the first captured image signal sequentially read out from the first pixels through the first readout control and causes an image based on the live view image data to be displayed on a display unit;
a first storage unit that integrates and stores the first captured image signal sequentially read out from the first pixels through at least the first readout control among the first readout control and the second readout control, and stores the second captured image signal read out from the second pixels through the second readout control;
an image processing unit that processes a third captured image signal comprising the first captured image signal and the second captured image signal stored in the first storage unit to generate captured image data and stores the captured image data in a storage medium; and
a second storage unit outside the imaging element, the second storage unit storing the first captured image signal sequentially read out from the first pixels while overwriting the first captured image signal through the first readout control,
wherein the display control unit processes the first captured image signal stored in the second storage unit to generate the live view image data.

3. An imaging device comprising:
a MOS type imaging element comprising a plurality of pixels;
a mechanical shutter disposed in front of the imaging element;
a driving unit that drives the imaging element;
an imaging control unit that performs still image exposure control for controlling the driving unit in a state in which the mechanical shutter is open to simultaneously start exposure of the plurality of pixels and closing the mechanical shutter to simultaneously end the exposure of the plurality of pixels, first readout control for controlling the driving unit during the exposure to read out a first captured image signal from first pixels included in the plurality of pixels at each of a plurality of timings during the exposure, and second readout control for reading out, after the exposure ends, a second captured image signal from at least second pixels included in the plurality of pixels and being other than the first pixels from among the first pixels and the second pixels;
a display control unit that generates live view image data based on the first captured image signal sequentially read out from the first pixels through the first readout control and causes an image based on the live view image data to be displayed on a display unit;
a first storage unit that integrates and stores the first captured image signal sequentially read out from the first pixels through at least the first readout control among the first readout control and the second readout control, and stores the second captured image signal read out from the second pixels through the second readout control; and
an image processing unit that processes a third captured image signal comprising the first captured image signal and the second captured image signal stored in the first storage unit to generate captured image data and stores the captured image data in a storage medium,
wherein the imaging element comprises
a second storage unit that stores the first captured image signal sequentially read out from the first pixels while overwriting the first captured image signal through the first readout control, and
a transfer unit that transfers the first captured image signal stored in the second storage unit to the display control unit.

4. The imaging device according to claim 1, wherein the first storage unit is embedded in the imaging element.

5. The imaging device according to claim 2, wherein the first storage unit is embedded in the imaging element.

6. The imaging device according to claim 3, wherein the first storage unit is embedded in the imaging element.

7. A still image capturing method of an imaging device comprising a MOS type imaging element including a plurality of pixels, a mechanical shutter disposed in front of the imaging element, and a driving unit that performs driving for reading out an imaging signal from the pixels, the still image capturing method comprising:
a still image exposure control step of controlling the driving unit in a state in which the mechanical shutter is open to simultaneously start exposure of the plurality of pixels and closing the mechanical shutter to simultaneously end the exposure of the plurality of pixels;
a first readout control step of controlling the driving unit during the exposure to read out a first captured image signal from first pixels included in the plurality of pixels at each of a plurality of timings during the exposure;
a second readout control step of controlling the driving unit after the exposure ends to read out a second captured image signal from at least second pixels included in the plurality of pixels and being other than the first pixels from among the first pixels and the second pixels;
a display control step of generating live view image data based on the first captured image signal sequentially read out from the first pixels in the first readout control step and causing an image based on the live view image data to be displayed on a display unit;

a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and an image processing step of processing a third captured image signal comprising the first captured image signal and the second captured image signal stored in the first storage unit to generate captured image data and storing the captured image data in a storage medium, wherein the second readout control step includes reading out the first captured image signal from the first pixels and reading out the second captured image signal from the second pixels after the exposure ends in a case in which a first timing at which the reading out of the first captured image signal is completed immediately before the exposure ends and a second timing at which the mechanical shutter is closed do not match each other, and reading out the second captured image signal from only the second pixels after the exposure ends in a case in which the first timing and the second timing match each other.

8. A still image capturing method of an imaging device comprising a MOS type imaging element including a plurality of pixels, a mechanical shutter disposed in front of the imaging element, and a driving unit that performs driving for reading out an imaging signal from the pixels, the still image capturing method comprising:

a still image exposure control step of controlling the driving unit in a state in which the mechanical shutter is open to simultaneously start exposure of the plurality of pixels and closing the mechanical shutter to simultaneously end the exposure of the plurality of pixels;

a first readout control step of controlling the driving unit during the exposure to read out a first captured image signal from first pixels included in the plurality of pixels at each of a plurality of timings during the exposure;

a second readout control step of controlling the driving unit after the exposure ends to read out a second captured image signal from at least second pixels included in the plurality of pixels and being other than the first pixels from among the first pixels and the second pixels;

a display control step of generating live view image data based on the first captured image signal sequentially read out from the first pixels in the first readout control step and causing an image based on the live view image data to be displayed on a display unit;

a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and an image processing step of processing a third captured image signal comprising the first captured image signal and the second captured image signal stored in the first storage unit to generate captured image data and storing the captured image data in a storage medium, wherein the imaging device further comprises a second storage unit outside the imaging element, the second storage unit storing the first captured image signal sequentially read out from the first pixels while overwriting the first captured image signal in the first readout control step, and the display control step comprises processing the first captured image signal stored in the second storage unit to generate the live view image data.

9. A still image capturing method of an imaging device comprising a MOS type imaging element including a plurality of pixels, a mechanical shutter disposed in front of the imaging element, and a driving unit that performs driving for reading out an imaging signal from the pixels, the still image capturing method comprising:

a still image exposure control step of controlling the driving unit in a state in which the mechanical shutter is open to simultaneously start exposure of the plurality of pixels and closing the mechanical shutter to simultaneously end the exposure of the plurality of pixels;

a first readout control step of controlling the driving unit during the exposure to read out a first captured image signal from first pixels included in the plurality of pixels at each of a plurality of timings during the exposure;

a second readout control step of controlling the driving unit after the exposure ends to read out a second captured image signal from at least second pixels included in the plurality of pixels and being other than the first pixels from among the first pixels and the second pixels;

a display control step of generating live view image data based on the first captured image signal sequentially read out from the first pixels in the first readout control step and causing an image based on the live view image data to be displayed on a display unit;

a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and an image processing step of processing a third captured image signal comprising the first captured image signal and the second captured image signal stored in the first storage unit to generate captured image data and storing the captured image data in a storage medium, wherein the imaging element comprises a second storage unit that stores the first captured image signal sequentially read out from the first pixels in the first readout control step while overwriting the first captured image signal, and a transfer unit that outputs the first captured image signal stored in the second storage unit.

10. The still image capturing method according to claim 7, wherein the first storage unit is embedded in the imaging element.

11. The still image capturing method according to claim 8, wherein the first storage unit is embedded in the imaging element.

12. The still image capturing method according to claim 9, wherein the first storage unit is embedded in the imaging element.

13. A computer readable medium storing a still image capturing program causing an imaging device comprising a MOS type imaging element including a plurality of pixels, a mechanical shutter disposed in front of the imaging element, and a driving unit that performs driving for reading out an imaging signal from the pixels to execute:
- a still image exposure control step of controlling the driving unit in a state in which the mechanical shutter is open to simultaneously start exposure of the plurality of pixels and closing the mechanical shutter to simultaneously end the exposure of the plurality of pixels;
- a first readout control step of controlling the driving unit during the exposure to read out a first captured image signal from first pixels included in the plurality of pixels at each of a plurality of timings during the exposure;
- a second readout control step of controlling the driving unit after the exposure ends to read out a second captured image signal from at least second pixels included in the plurality of pixels and being other than the first pixels from among the first pixels and the second pixels;
- a display control step of generating live view image data based on the first captured image signal sequentially read out from the first pixels in the first readout control step and causing an image based on the live view image data to be displayed on a display unit;
- a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and
- an image processing step of processing a third captured image signal comprising the first captured image signal and the second captured image signal stored in the first storage unit to generate captured image data and storing the captured image data in a storage medium,
- wherein the second readout control step includes reading out the first captured image signal from the first pixels and reading out the second captured image signal from the second pixels after the exposure ends in a case in which a first timing at which the reading out of the first captured image signal is completed immediately before the exposure ends and a second timing at which the mechanical shutter is closed do not match each other, and reading out the second captured image signal from only the second pixels after the exposure ends in a case in which the first timing and the second timing match each other.

14. A computer readable medium storing a still image capturing program causing an imaging device comprising a MOS type imaging element including a plurality of pixels, a mechanical shutter disposed in front of the imaging element, and a driving unit that performs driving for reading out an imaging signal from the pixels to execute:
- a still image exposure control step of controlling the driving unit in a state in which the mechanical shutter is open to simultaneously start exposure of the plurality of pixels and closing the mechanical shutter to simultaneously end the exposure of the plurality of pixels;
- a first readout control step of controlling the driving unit during the exposure to read out a first captured image signal from first pixels included in the plurality of pixels at each of a plurality of timings during the exposure;
- a second readout control step of controlling the driving unit after the exposure ends to read out a second captured image signal from at least second pixels included in the plurality of pixels and being other than the first pixels from among the first pixels and the second pixels;
- a display control step of generating live view image data based on the first captured image signal sequentially read out from the first pixels in the first readout control step and causing an image based on the live view image data to be displayed on a display unit;
- a step of integrating the first captured image signal sequentially read out from the first pixels in at least the first readout control step between the first readout control step and the second readout control step, and storing the first captured image signal in a first storage unit, and storing the second captured image signal read out from the second pixels in the second readout control step in the first storage unit; and
- an image processing step of processing a third captured image signal comprising the first captured image signal and the second captured image signal stored in the first storage unit to generate captured image data and storing the captured image data in a storage medium,
- wherein the imaging device further comprises a second storage unit outside the imaging element, the second storage unit storing the first captured image signal sequentially read out from the first pixels while overwriting the first captured image signal in the first readout control step, and
- the display control step comprises processing the first captured image signal stored in the second storage unit to generate the live view image data.

* * * * *